US012812695B2

(12) United States Patent
Kumar

(10) Patent No.: US 12,812,695 B2
(45) Date of Patent: Nov. 24, 2026

(54) INTERLEAVING PRE-COMPENSATION FOR RANDOM ACCESS

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 18/484,040

(22) Filed: Oct. 10, 2023

(65) Prior Publication Data

US 2025/0119952 A1 Apr. 10, 2025

(51) Int. Cl.
*H04W 74/0836* (2024.01)
*H04W 74/00* (2009.01)
*H04W 74/0833* (2024.01)

(52) U.S. Cl.
CPC ..... *H04W 74/0836* (2024.01); *H04W 74/006* (2013.01); *H04W 74/0833* (2013.01)

(58) Field of Classification Search
CPC ............... H04W 74/006; H04W 74/08; H04W 74/0833; H04W 74/0836
See application file for complete search history.

(56) References Cited

U.S. PATENT DOCUMENTS

2021/0282180 A1* 9/2021 Kang .................... H04W 52/42
2022/0046711 A1* 2/2022 Kronander ........ H04W 56/0045
2022/0272762 A1* 8/2022 Määttänen ........ H04W 74/0841
2022/0295572 A1* 9/2022 Sedin ................ H04W 72/0453
2022/0353855 A1* 11/2022 Li ..................... H04W 74/0891
2023/0022798 A1* 1/2023 Li ..................... H04W 74/0833
2023/0069881 A1* 3/2023 Rastegardoost .... H04W 74/006
2023/0107781 A1* 4/2023 Medeiros De Amorim ................ H04W 74/002 370/350
2023/0224840 A1* 7/2023 Hu ..................... H04B 7/18513 370/350
2023/0350081 A1* 11/2023 Wu ........................... G01S 5/01
2023/0354436 A1* 11/2023 Manolakis ........ H04W 74/0833
(Continued)

FOREIGN PATENT DOCUMENTS

WO WO-2025056154 A1 * 3/2025 ......... H04B 7/18513

OTHER PUBLICATIONS

Chougrani et al., "NB-IoT Random Access for Nonterrestrial Networks: Preamble Detection and Uplink Synchronization", Oct. 27, 2021, IEEE, IEEE Internet of Things Journal ( vol. 9, Issue: 16, Aug. 15, 2022), pp. 14913-14927, DOI: 10.1109/JIOT.2021.3123376 (Year: 2021).*

(Continued)

*Primary Examiner* — Paul H. Masur
(74) *Attorney, Agent, or Firm* — Dinsmore & Shohl LLP

(57) ABSTRACT

Certain aspects of the present disclosure provide techniques for applying interleaving pre-compensation for random access communications. A method for wireless communications by an apparatus includes obtaining a configuration for pre-compensating at least one transmission associated with at least one random access communication; sending a plurality of transmissions for random access in accordance with the configuration; in response to sending the plurality of transmissions, receiving one or more transmissions; and communicating with a network entity based at least in part on the one or more transmissions.

27 Claims, 12 Drawing Sheets

(56) References Cited

U.S. PATENT DOCUMENTS

| | | | | |
|---|---|---|---|---|
| 2024/0040625 | A1* | 2/2024 | Ji | H04W 74/0833 |
| 2024/0073842 | A1* | 2/2024 | Myung | H04B 7/18513 |
| 2025/0267721 | A1* | 8/2025 | Han | H04W 74/0833 |

OTHER PUBLICATIONS

Zhang et al., "Random Access Preamble Design for Large Frequency Shift in Satellite Communication", Nov. 28, 2019, IEEE, 2019 IEEE 2nd 5G World Forum (5GWF), 10.1109/5GWF.2019.8911614 (Year: 2019).*

3GPP: "3rd Generation Partnership Project, Technical Specification Group Radio Access Network, NR, Medium Access Control (MAC) Protocol Specification (Release 17)", 3GPP TS 38.321 V17.6.0, Sep. 2023, pp. 1-251, section 6.1.3.28.

3GPP: "3rd Generation Partnership Project, Technical Specification Group Radio Access Network, NR, Physical Layer Procedures for Control (Release 18)", 3GPP TS 38.213, V18.0.0, Sep. 2023, pp. 1-286, section 7.1.1.

3GPP: "3rd Generation Partnership Project, Technical Specification Group Radio Access Network, NR, Physical Layer Procedures for Data (Release 18)", 3GPP TS 38.214 V18.0.0, Sep. 2023, pp. 1-278.

* cited by examiner

INTERLEAVING PRE-COMPENSATION FOR RANDOM ACCESS

INTRODUCTION

Field of the Disclosure

Aspects of the present disclosure relate to wireless communications, and more particularly, to techniques for random access communications.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus (e.g., a user equipment). The method includes obtaining a configuration for pre-compensating at least one transmission associated with at least one random access communication; sending a plurality of transmissions for random access in accordance with the configuration; in response to sending the plurality of transmissions, receiving one or more transmissions; and communicating with a network entity based at least in part on the one or more transmissions.

Another aspect provides a method for wireless communications by an apparatus (e.g., a network entity). The method includes sending a configuration for pre-compensating at least one transmission associated with at least one random access communication; obtaining a plurality of transmissions for random access in accordance with the configuration; in response to obtaining the plurality of transmissions, sending one or more transmissions; and communicating with a user equipment (UE) based at least in part on the one or more transmissions.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
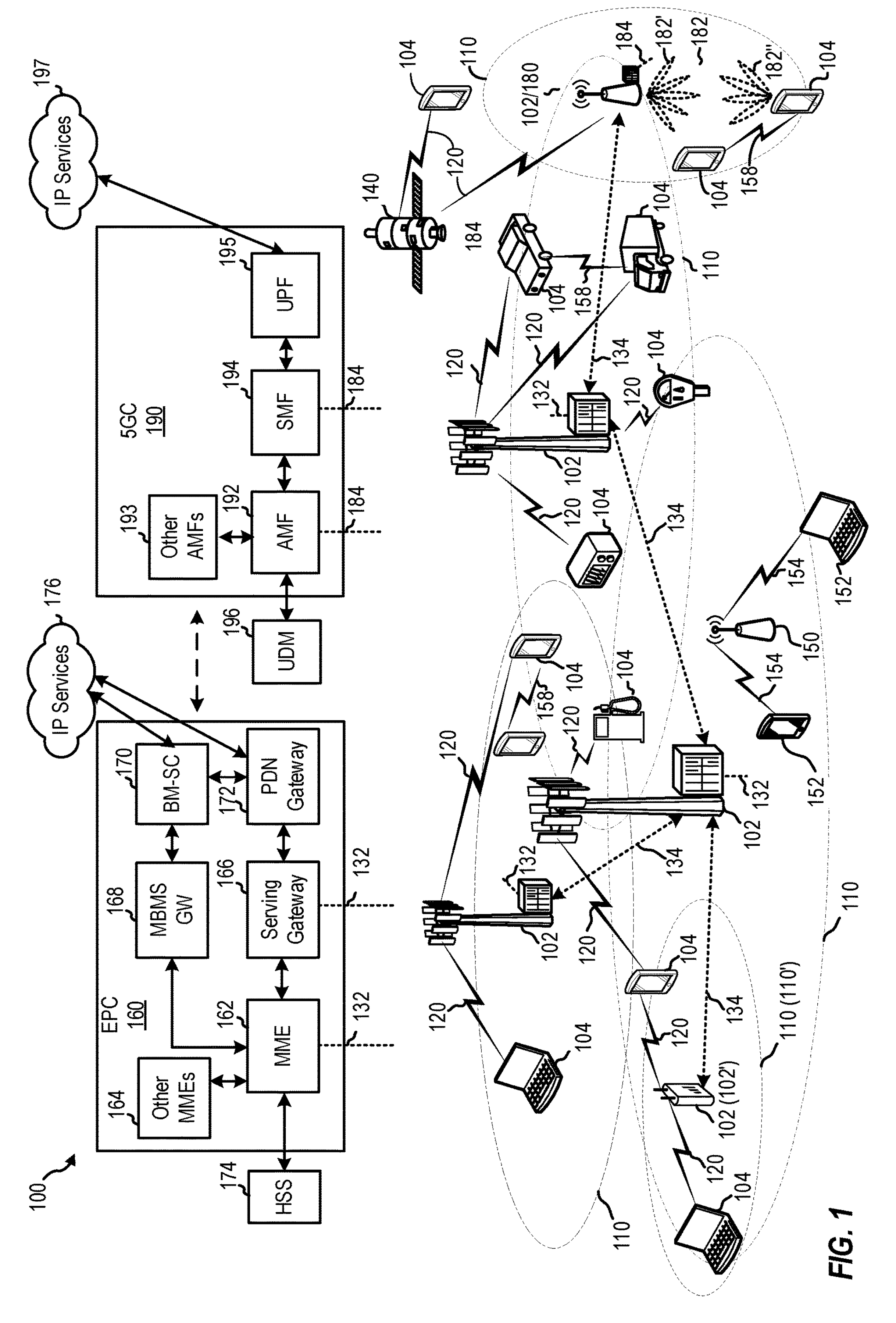
FIG. 1 depicts an example wireless communications network.

Aspects of the present disclosure provide apparatuses, methods, processing systems, and computer-readable mediums for applying interleaving pre-compensation for random access communications.

Certain wireless communication systems (e.g., Evolved Universal Terrestrial Radio Access (E-UTRA) systems, 5G New Radio (NR) systems, and/or future wireless communication systems) may facilitate communications coverage via a non-terrestrial network (NTN), such as a spaceborne (e.g., satellite) or airborne (e.g., airship, balloon, etc.) platform that provides wireless connectivity to certain devices, such as user equipments (UEs). In some cases, NTN communications may further facilitate communications with Narrowband Internet of Things (NB-IoT) devices, such as a sensor and/or identification tag attached to a vehicle (e.g., a delivery truck). Wireless communication systems may further implement random access procedures to access the radio access network (RAN) including an NTN. Reference to a RAN performing certain operations, as discussed herein, may refer to one or more network entities (e.g., a base station, an NTN, and/or one or more disaggregated entities thereof) performing said operations.

Technical problems for NTN communications include, for example, the duration of time and the number of transmission attempts used to perform successful random access communications between an UE and an NTN. The round-trip time (RTT) for NTN communications can be a relatively long duration (e.g., 500 milliseconds for a geosynchronous equatorial orbit (GEO)) for wireless communications. NTN communications may experience Doppler frequency shifts due to the relative mobility between the UE and the NTN. In some cases, NTN communications may encounter deep fading (e.g., signal attenuations), for example, due to intervening weather or other particles in the atmosphere, multipath induced fading, and/or obstacle induced fading. In such scenarios, a UE may perform repeated random access attempts before the NTN is able to successfully decode a random access transmission from the UE. For example, the UE may transmit random access preamble transmissions across multiple periodic random access channel (RACH) occasions, as further described below. The multiple random access attempts may be performed due to the UE being out of sync with the NTN for the UE using certain pre-compensations (e.g., Doppler pre-compensation and/or timing delay pre-compensation) for NTN communications. A pre-compensation may include changing a characteristic of a signal, such as a carrier frequency or the timing of a transmission, prior to transmitting the signal, such as to compensate for how a communications path affects the signal while the signal is propagating (e.g., a frequency shift to compensate for Doppler effects and/or a time delay to compensate for a propagation delay). As a result of repeated random access attempts, the UE may take an extended time (e.g., multiple seconds or even minutes) to successfully complete a random access procedure and establish a communication link with an NTN. The repeated random access attempts may cause interference for other devices attempting to perform a random access procedure, and thus, the RACH capacity may effectively be reduced by repeated random access attempts.

Aspects described herein overcome the aforementioned technical problem(s) by providing interleaving pre-compensation for random access transmissions. A UE may send multiple random access transmissions (e.g., RACH preamble transmissions) with differing pre-compensations, for example, for Doppler effects and/or timing delays (e.g., RTT). As an example, the UE may apply different frequency pre-compensations to multiple preamble transmissions that may be transmitted before receiving a response from the NTN. In certain cases, the UE may transmit the multiple preamble transmissions in a RACH occasion allocated for random access communications and/or in the RACH occasion shifted in time by a timing pre-compensation described herein. A RACH occasion may define a time window for when a UE is allowed to transmit a random access preamble in the RACH. In some cases, the UE may be configured with certain parameters for performing the interleaving pre-compensation such as a total of number of transmissions to use for the random access transmissions.

The techniques for interleaving pre-compensation for random access as described herein may provide any of various beneficial effects and/or advantages. The techniques for interleaving pre-compensation may enable improved wireless communication performance, such as reduced latencies associated with a random access procedure, increased random access resource capacity, increased success rate in completing a random access procedure, etc. The improved wireless communication performance may be attributable to the interleaving pre-compensation described herein that allows a UE to transmit multiple random access transmissions with differing pre-compensations. Additional and/or alternative benefits tied to the various aspects for random access interleaving pre-compensation are further described herein.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities), such as satellite 140, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
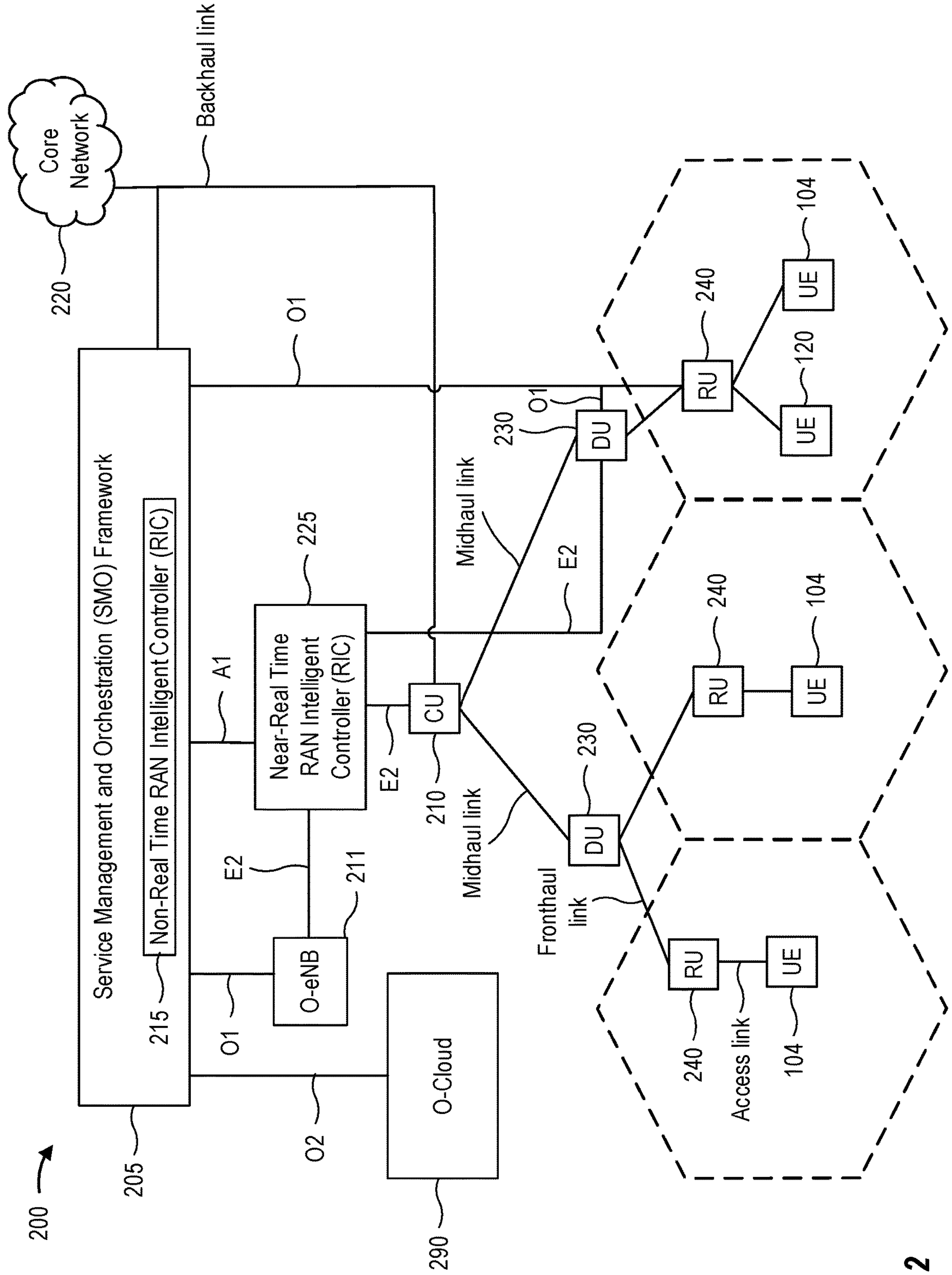
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5GNR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182''. UE 104 may also transmit a beamformed signal to the BS 180 in one or more transmit directions 182''. BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an AI interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as AI policies).

Figure 3:
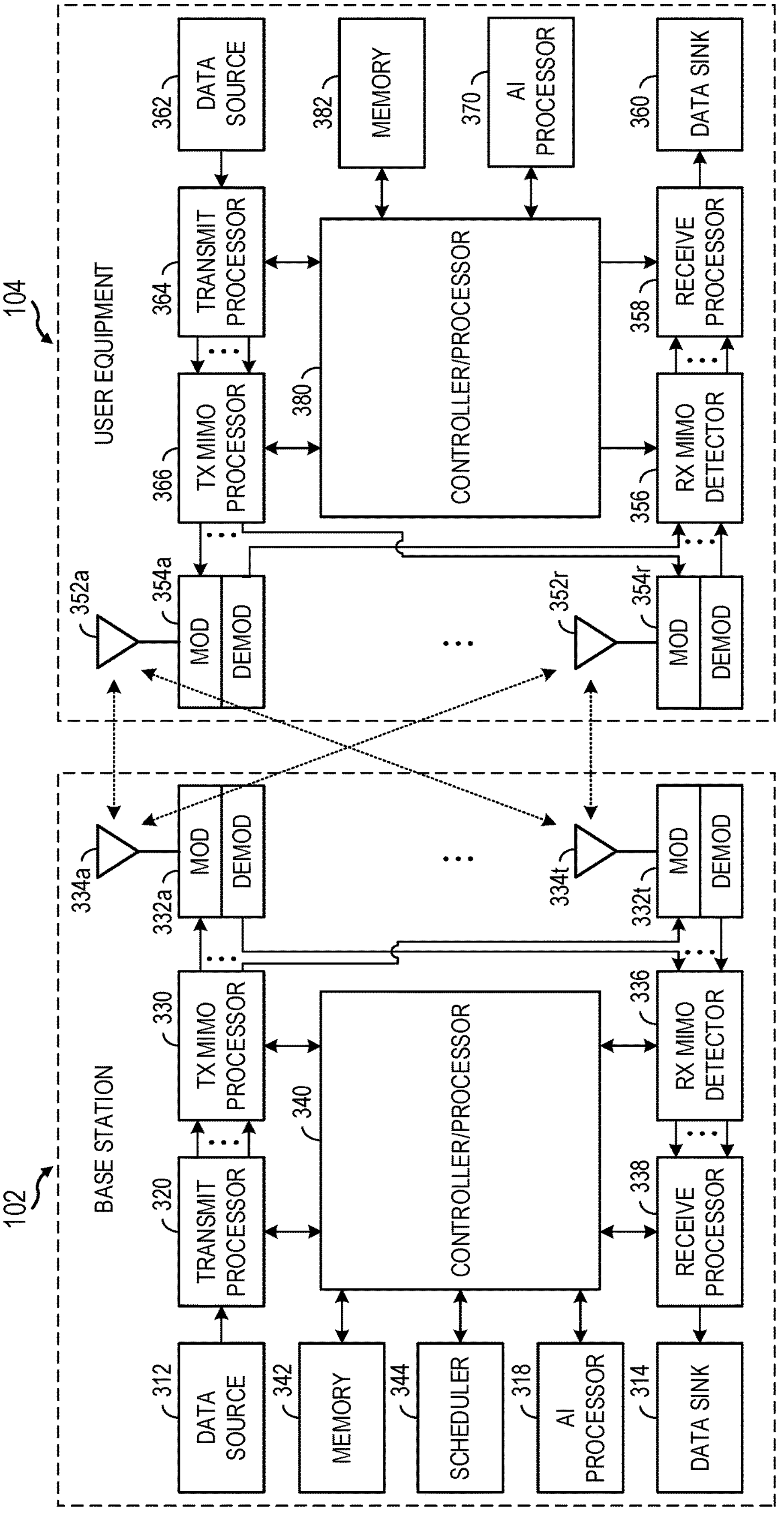
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, 370, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., global navigation satellite system (GNSS) positioning). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
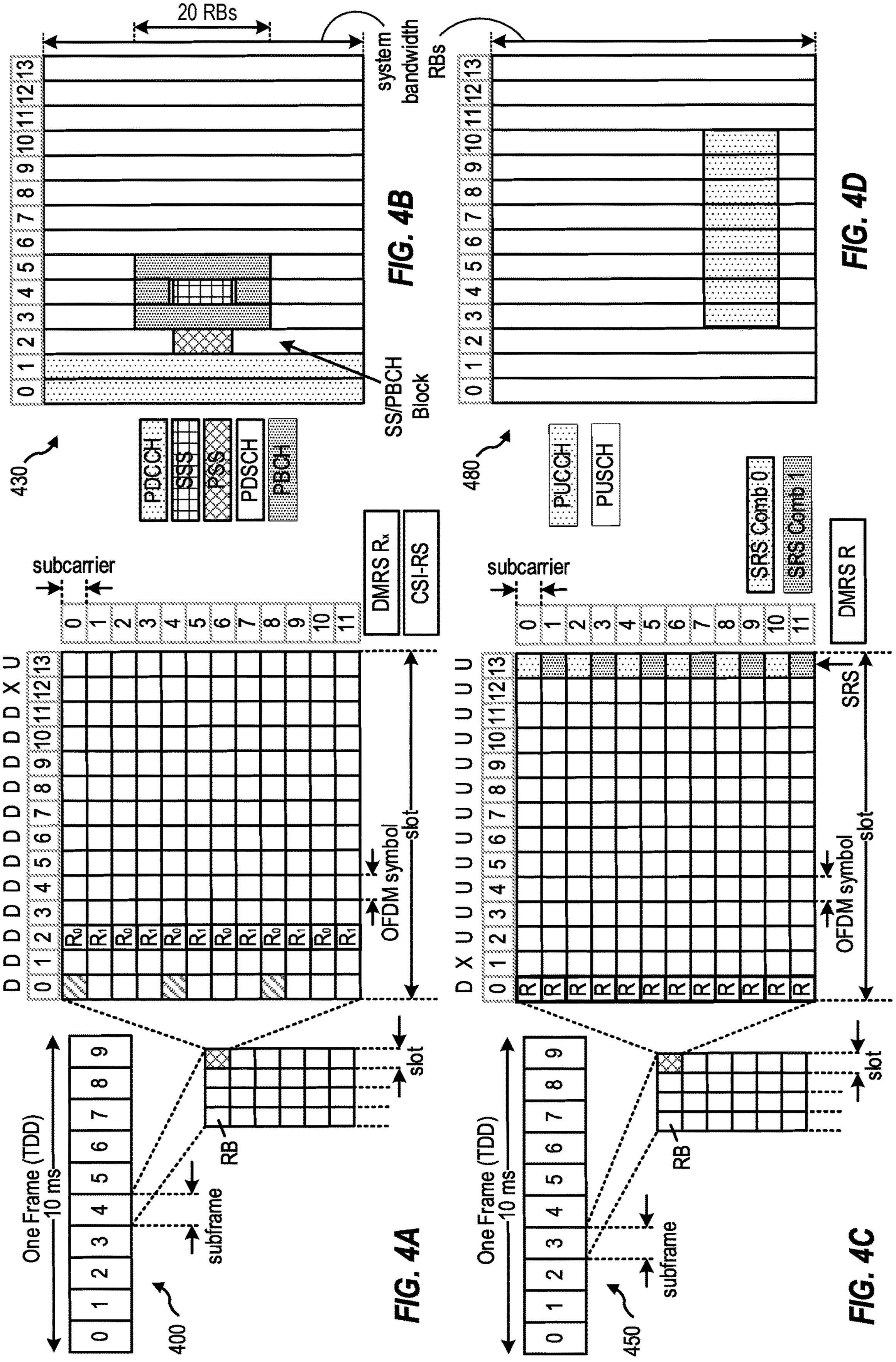
FIGS. 4A, 4B, 4C, and 4D depict various example aspects of data structures for a wireless communications network.

In particular, FIG. 4A is a diagram 400 illustrating an example of a first subframe within a 5G (e.g., 5GNNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology p, there are 2 slots per subframe. Thus, numerologies (p) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to 21×15 kHz, where is the numerology 0 to 6. As an example, the numerology p=0 corresponds to a subcarrier spacing of 15 kHz, and the numerology p=6 corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology p=2 with 4 slots per subframe. In such a case, the slot duration is 0.25 ms, the subcarrier spacing is 60 kHz, and the symbol duration is approximately 16.67 s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Non-Terrestrial Network Communications

Figure 5:
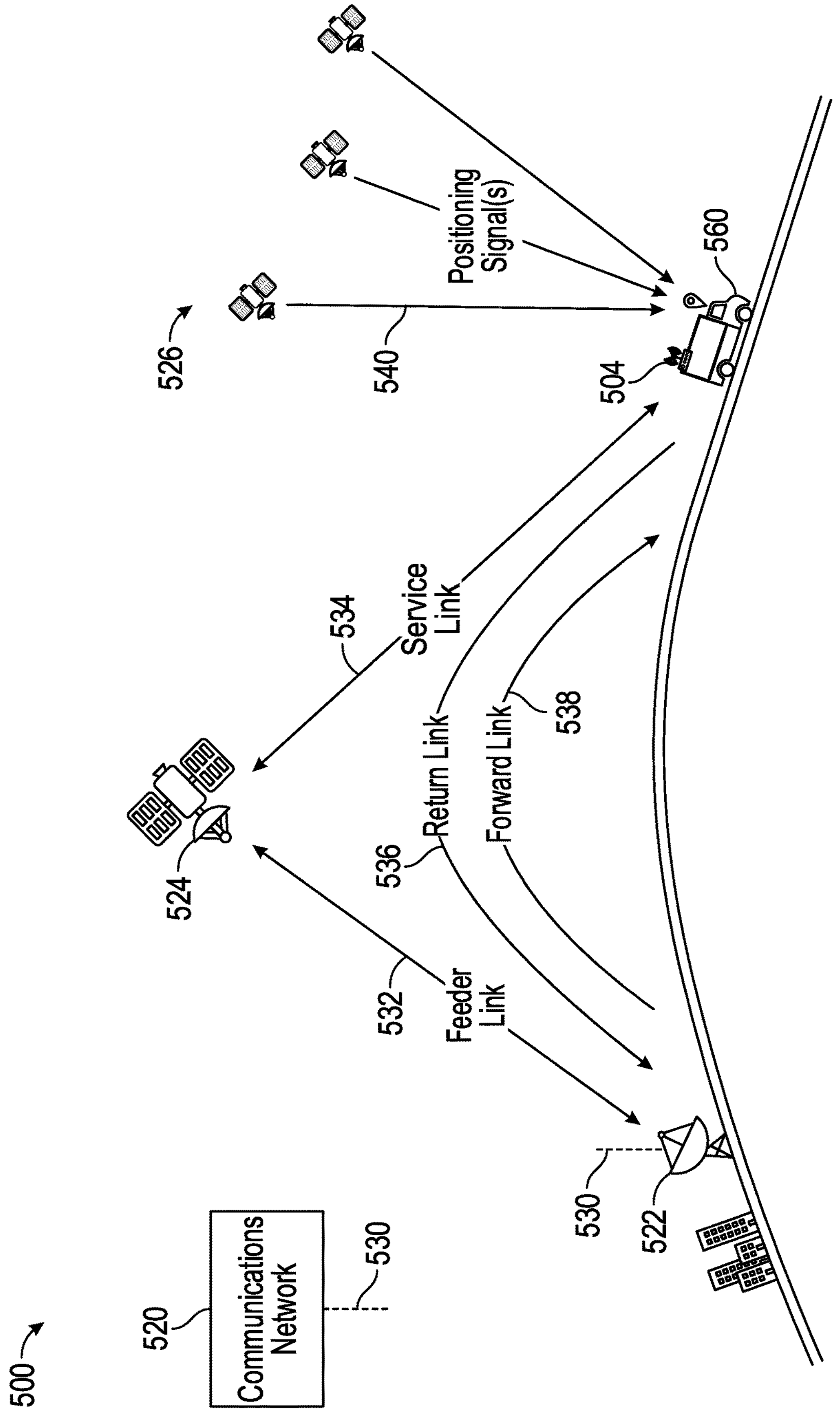
FIG. 5 depicts an example non-terrestrial network.

FIG. 5 depicts an example non-terrestrial network (NTN) 500. In this example, the NTN 500 includes a communications network 520 (e.g., the EPC 160 and/or the 5GC network 190 of FIG. 1), an NTN gateway 522, and an NTN payload 524. The NTN 500 may facilitate wireless communications with one or more UEs 504 (e.g., the UE 104 of FIG. 1). The UE 504 may include any of various types of UEs, such as an NB-IoT UE. As an example, the UE 504 may include an IoT sensor and/or identification tag affixed to a vehicle 560. The NTN 500 may allow the UE 504 to be in a coverage area for wireless communications even where the vehicle 560 travels great distances, for example, across one or more countries, or is stationed in certain locations lacking a terrestrial communications network. Note that the NB-IoT UE is an example, and other UEs may be capable of NTN communications.

The NTN gateway 522 may communicate with the communications network 520 via one or more interfaces 530, such as backhaul links including NG interface(s) and/or S1 interface(s) between a RAN and a core network. The interface(s) 530 may include wired and/or wireless connections. The NTN gateway 522 may serve one or more NTN payloads 524.

The NTN payload 524 may be or include one or more airborne platforms (e.g., a drone or balloon) and/or one or more spaceborne platforms (e.g., the satellite 140 as depicted in FIG. 1). The NTN payload 524 may be served by one or more NTN gateways 522. In certain aspects, the NTN payload 524 may include any of various non-terrestrial network entities and/or platforms that provide radio access through Geosynchronous orbits (GSO), Non-Geosynchronous Orbit (NGSO), which includes Low-Earth Orbit (LEO) and Medium Earth Orbit (MEO), or High Altitude Platform Systems (HAPS).

The NTN payload 524 may transparently forward communications (e.g., the radio protocol) received from the UE 504 (via a service link 534) to the NTN gateway 522 (via a feeder link 532), and/or vice-versa. The NTN gateway 522 and the NTN payload 524 may communicate via a wireless communication link referred to as the feeder link 532, and the NTN payload 524 may communicate with the UE 504 via a wireless communication link referred to as the service link 534. In some cases, the transparent links between the NTN gateway 522 and the UE 504 may be referred to as a return link 536 for communications from the UE 504 to the NTN gateway 522 and as a forward link 538 for communications from the NTN gateway 522 to the UE 504. In certain aspects, for communications from the NTN gateway 522, the NTN payload 524 may change the carrier frequency used on the feeder link 532, before re-transmitting the communications on the service link 534, and/or vice versa (respectively on the feeder link).

The service link 534 may include an Earth-fixed service link, a quasi-Earth-fixed service link, and/or an Earth-moving service link. An Earth-fixed service link may be implemented by beam(s) continuously covering the same geographical area(s) all the time (e.g., the case of GSO satellites). A quasi-Earth-fixed service link may be provisioned by beam(s) covering one geographic area for a limited period and a different geographic area during another period (e.g., the case of NGSO satellites generating steerable beams). An Earth-moving service link may be provisioned by beam(s) with a coverage area that slides over the Earth surface (e.g., the case of NGSO satellites generating fixed or non-steerable beams).

In certain aspects, the UE 504 may be in communication with a global navigation satellite system (GNSS) 526. For example, the UE 504 may receive positioning signal(s) 540 from the GNSS 526, and the positioning signal(s) 540 may provide certain information for synchronizing (e.g., time and/or frequency synchronization) the service link 534. The UE 504 may obtain the location of the NTN payload 524 via system information from the NTN payload 524. The UE 504 may estimate a timing delay and Doppler effects associated with the service link 534 using the positioning signal(s) 540 and the location of the NTN payload 524.

Example Random Access Procedures

Certain wireless communication systems (e.g., an E-UTRA system, 5G NR system, and/or any other generation of wireless communications) may provide a specified channel for random access, such as a random access channel (RACH), and corresponding random access procedures. A UE may use the RACH for initial access to a RAN, for example. A random access procedure may be performed for any of various events including, for example, initial access from an idle state (e.g., RRC idle), RRC connection re-establishment, handover, downlink (DL) and/or uplink (UL) data arrival (e.g., when the UE is in an idle state), or device positioning.

Figure 6A:
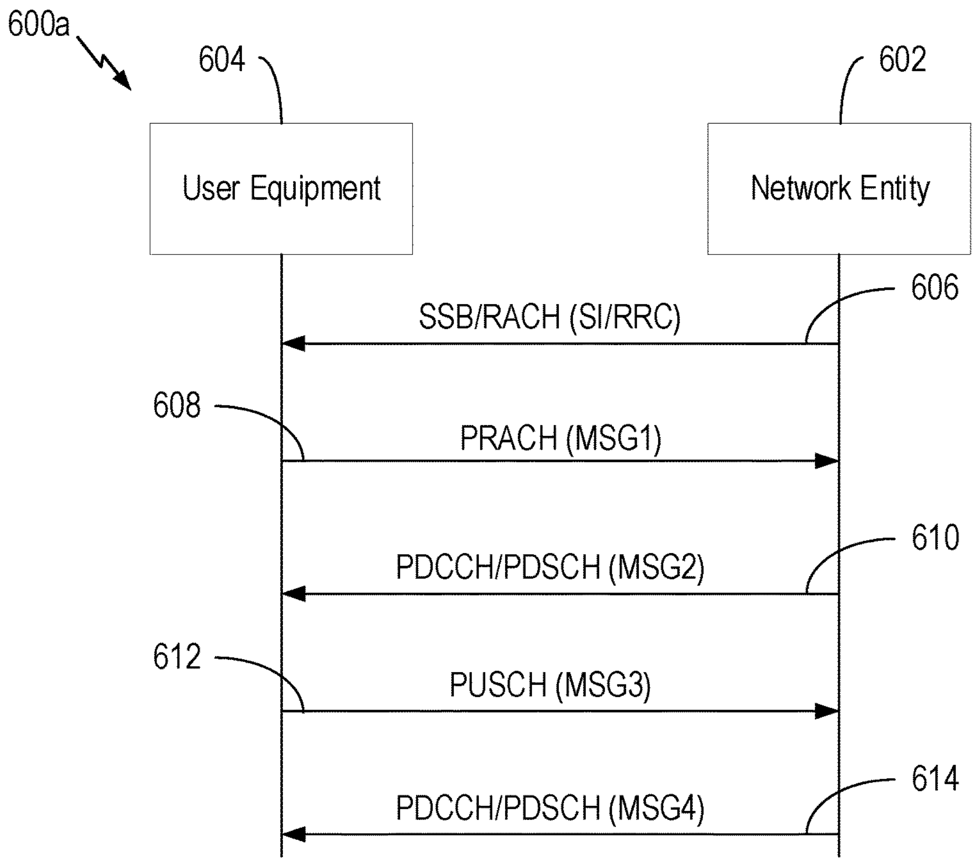
FIG. 6A is an example process flow diagram illustrating an example four-step random access procedure performed between a UE and a network entity.

FIG. 6A depicts a process flow diagram of an example four-step RACH procedure 600*a* performed between a UE 604 and a network entity 602. In some aspects, the UE 604 is the UE 104 depicted and described with respect to FIGS. 1 and 3, and the network entity 602 is the base station 102 depicted and described with respect to FIGS. 1 and 3 or a disaggregated base station depicted and described with respect to FIG. 2.

The RACH procedure 600*a* may optionally begin at 606, where the network entity 602 broadcasts and the UE 604 receives a random access configuration, for example, in system information within a synchronization signal block, or within an RRC message. The random access configuration may indicate or include one or more parameters for random access communications, such as defining the RACH, the number of random access preambles (e.g., preamble sequences) available for random access, power ramping parameters, response window size, etc.

At 608, the UE 604 sends a first message (MSG1) to the network entity 602 on a physical random access channel (PRACH). In some aspects, MSG1 may indicate or include a RACH preamble. The RACH preamble may indicate or include a preamble signature associated with the RACH preamble. The preamble signature may correspond to a particular preamble sequence (e.g., a Zaddoff Chu sequence) generated across time-frequency resources used for the preamble transmission. For contention-based random access, the preamble sequence may be randomly selected among a set of preamble sequences (e.g., up to 64 sequences in some cases). The preamble signature may be used to identify the UE 604 for scheduling communications (e.g., MSG2 and MSG3) with the network entity. The term "RACH preamble" may interchangeably refer to or correspond to "random access preamble," "preamble," "preamble sequence," and/or "preamble signature."

At 610, the network entity 602 may respond with a random access response (RAR) message (MSG2). For example, the network entity 602 may send a PDCCH communication including downlink control information (DCI) that schedules the RAR on the PDSCH. The RAR may include, for example, certain parameters used for an uplink transmission such as a random access (RA) preamble identifier (RAPID), a timing advance, an uplink (UL) grant (e.g., indicating one or more time-frequency resources for an uplink transmission), cell radio network temporary identifier (C-RNTI), and a backoff parameter value. The RAPID may correspond to the preamble signature and indicate that the RAR is for the UE 604 that transmitted MSG1 at 606. As an example, the RAPID may identify a particular frequency resource used for the preamble transmission. As further described herein, the backoff parameter value may be used to determine a RACH occasion for sending a subsequent RACH transmission (e.g., a preamble transmission). A RACH occasion may correspond to one or more time resources available for transmitting a preamble in a RACH.

At 612, in response to MSG2, the UE 604 transmits a third message (MSG3) to the network entity 602 on the PUSCH. In some aspects, MSG3 may include an RRC connection request, a tracking area update (e.g., for UE mobility), and/or a scheduling request (for an UL transmission). As an example, MSG 3 uses the time-frequency resource(s) indicated in the UL grant of the RAR.

At 614, the network entity 602 may send a contention resolution message (MSG4) in response to MSG3. In some cases, if the UE 604 is unable to receive or decode MSG3 and/or MSG4, the UE 604 may repeat the RACH procedure, such as the four-step RACH procedure 600*a*.

In some cases, to reduce the latency associated with random access, a two-step RACH procedure may be used. As the name implies, the two-step RACH procedure may effectively consolidate the four messages of the four-step RACH procedure into two messages.

Figure 6B:
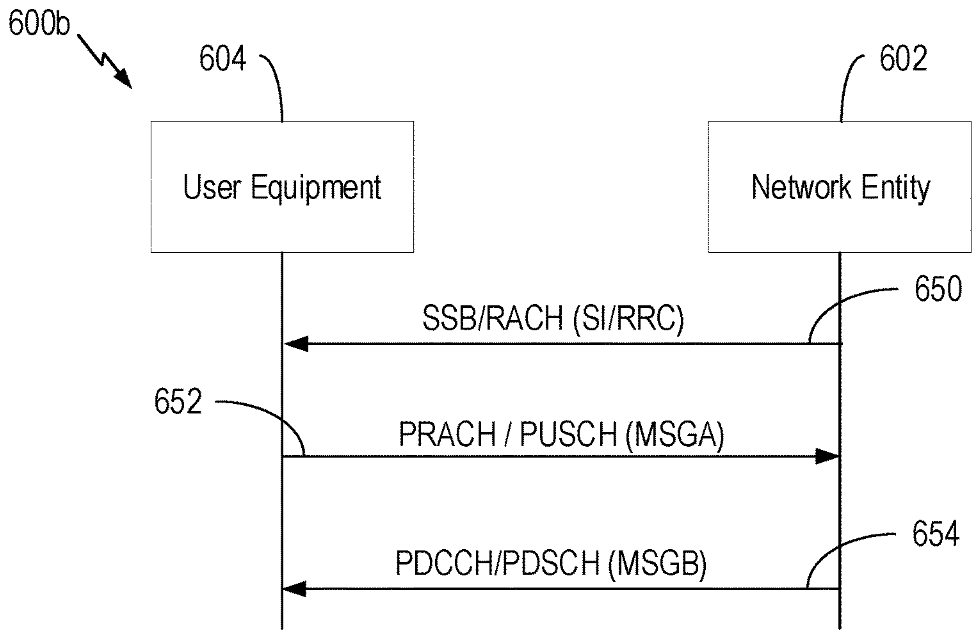
FIG. 6B is an example process flow diagram illustrating an example two-step random access procedure performed between a UE and a network entity.

FIG. 6B depicts a process flow diagram of an example two-step RACH procedure **600*b* performed between the UE 604 and the network entity 602**.

The procedure **600*b* may optionally begin at 650, where the network entity 502 broadcasts and the UE 504** receives a random access configuration, for example in system information within a synchronization signal block, or within an RRC message.

At 652, the UE 604 sends a first message (MSGA) to the network entity 602, which may effectively combine MSG1 and MSG3 described above with respect to FIG. 6A. In some aspects, MSGA includes a RACH preamble for random access and a payload. For example, the payload may include a UE-ID and other signaling information, such as a buffer status report or scheduling request. The RACH preamble of MSGA may be transmitted over the RACH, and the payload of MSGA may be transmitted over the PUSCH, for example.

At 654, the network entity 602 may send a random access response message (MSGB), which may effectively combine MSG2 and MSG4 described above. For example, MSGB may include a RAPID, a timing advance, a backoff parameter value, a contention resolution message, an uplink and/or downlink grant, and transmit power control commands.

Example NB-IoT Communications

Certain wireless communication systems (e.g., an E-UTRA system, 5G NR system, and/or any other generation of wireless communications) may enable access to network services using a physical layer configured for very low power consumption and low complexity, which may be beneficial for Internet-of-Things (IoT) devices operating on battery power or power harvesting circuitry. These low power network services may be referred to as narrowband IoT (NB-IoT) communications. For NB-IoT communications, a UE may be capable of data rates up to 68 kbps for downlink and up to 132 kbps for uplink, for example, via a full carrier bandwidth of 180-200 kHz and a subcarrier spacing of 3.75 kHz or 15 kHz. At such a low bandwidth, the NB-IoT device may support a low complexity transceiver to enable a low cost solution for IoT devices. In certain cases, a UE may be equipped with only a single antenna to facilitate the low power consumption and/or reduced complexity. In some cases, the low power consumption may enable an NB-IoT device to operate for at least 10 years on battery power or almost indefinitely with power harvesting. Note that the specification associated NB-IoT communications (e.g., the data rates, carrier bandwidth, and/or subcarrier spacing) are merely examples. Other specifications may be used in addition to or instead of those described for very low power consumption and low complexity wireless communications.

Technical problems for NTN communications include, for example, the duration of time and the number of transmission attempts used to perform successful random access communications between an UE and an NTN. The RTT for NTN communications can be a relatively long duration (e.g., 500 milliseconds for a GEO) for wireless communications. NTN communications may experience Doppler frequency shifts due to the relative mobility between the UE and the NTN. In some cases, NTN communications may encounter deep fading (e.g., signal attenuations), for example, due to intervening weather or other particles in the atmosphere, multi-path induced fading, and/or obstacle induced fading. In such scenarios, a UE may perform repeated random access attempts before the NTN is able to successfully decode a random access transmission from the UE. For example, the UE may transmit random access preamble transmissions across multiple periodic RACH occasions. The multiple random access attempts may be performed due to the UE being out of sync with the NTN for the UE using certain pre-compensations (e.g., Doppler pre-compensation and/or timing delay pre-compensation) for NTN communications. As a result of repeated random access attempts, the UE may take an extended time (e.g., multiple seconds or even minutes) to successfully complete a random access procedure and establish a communication link with an NTN. The repeated random access attempts may cause interference for other devices attempting to perform a random access procedure, and thus, the RACH capacity may effectively be reduced by repeated random access attempts.

NB-IoT communications may use a specified set of resources (e.g., RACH subcarriers) for random access to the RAN. For example, NB-IoT devices may be allocated up to 48 subcarriers in a narrowband PRACH (NPRACH) to select for random access to the RAN. As the number of deployed NB-IoT devices increases in a RAN (e.g., with the increased adoption of wirelessly connected IoT devices), there may be an increased likelihood of NB-IoT devices using the same subcarrier for random access. In such cases, where multiple NB-IoT devices are transmitting via the same subcarrier for random access, the RAN may be unable to decode certain random access transmissions (e.g., a MSG1 transmission or a MSG3 transmission) from the NB-IoT devices and respond to such transmissions, for example, due to inference between the overlapping transmissions from multiple NB-IoT devices. As such, NB-IoT devices may send an increased number of RACH attempts to establish a communication link with the RAN, which may result in an increased latency to establish a communication link with the RAN. As the random access procedure is used for various events, the performance of the random access procedure affects the performance of a variety of wireless communication activities, such as initial access, handover, UL/DL data arrival, etc. Therefore, there is a need for increasing the success rate of random access transmissions with respect to NTN communications for NB-IoT devices.

Aspects Related to Random Access Interleaving Pre-Compensation

Aspects of the present disclosure provide techniques for interleaving pre-compensation for random access transmissions. A UE may send multiple random access transmissions (e.g., RACH preamble transmissions and/or MSG transmissions) with differing pre-compensations, for example, for Doppler effects (e.g., frequency synchronization) and/or timing delays (e.g., RTT synchronization). As an example, the UE may apply different frequency pre-compensations to multiple preamble transmissions that may be transmitted before receiving a response from the NTN. In certain cases, the UE may transmit the multiple preamble transmissions (with preamble repetition(s)) in a RACH occasion allocated for random access communications and/or in the RACH occasion shifted in time by a timing pre-compensation as further described herein with respect to FIG. 7. In some cases, the UE may obtain a configuration associated with the interleaving pre-compensation. As an example, the configuration may indicate the number of random access transmissions to send in a RACH occasion or a MSG3 reservation.

The techniques for random access interleaving pre-compensation as described herein may provide any of various beneficial effects and/or advantages. The techniques for random access interleaving pre-compensation may enable improved wireless communication performance, such as reduced latencies associated with a random access procedure, increased random access resource capacity, increased success rate in completing a random access procedure, etc. The improved wireless communication performance may be attributable to the interleaving pre-compensation described herein that allows a UE to transmit multiple random access transmissions with differing pre-compensations. For example, interleaving pre-compensation (e.g., frequency and/or timing pre-compensation) may enable an increased likelihood that at least one of the random access transmissions is decodable at a network entity, such as an NTN payload. As a result, the interleaving pre-compensation may increase the success rate for random access communications, and the increased success rate for random access communications can free-up RACH resources (e.g., effectively increasing the RACH capacity) for other devices including, for example, NB-IoT devices. Moreover, the increased success rate for random access communication can reduce the latencies encountered for random access procedures.

For NTN communications, a UE may perform a frequency and/or time pre-compensation(s) to account for Doppler effects and/or a propagation delay associated with the service link between the UE and the NTN payload. For time pre-compensation, the UE may determine a propagation delay (e.g., an average delay and/or delay spread) for the service link between the UE and the NTN payload. In certain aspects, the time pre-compensation may include a timing advance (TA) used to advance the timing for uplink transmissions, such as random access transmissions from the UE. For frequency pre-compensation, the UE may determine the Doppler effects (e.g., a Doppler shift and/or Doppler spread) for the service link between the UE and the NTN payload. For random access communications (e.g., MSG1 and/or MSG3 transmissions), the UE may adjust the UL transmit frequency (for example, for the baseband signal) by the estimated Doppler shift. For random access communications, the UE may use estimates for the frequency and/or time pre-compensation that may not match the actual propagation delay and/or Doppler shifts exhibited on the service link.

Example Interleaving Pre-Compensation

In certain aspects, the UE may apply interleaving pre-compensation for random access communications (e.g., MSG1 and/or MSG3 transmissions). For example, the UE may transmit multiple random access preambles, where at least one of the random access preambles uses a different pre-compensation (e.g., frequency and/or timing) than the other random access preambles. The UE may apply a different time and frequency correction for each of the random access preamble transmissions. The spread of pre-compensations may improve RACH success rate and reduce the latency to establish a communication link between the UE and the network entity, especially, in challenging NTN environments.

Figure 7:
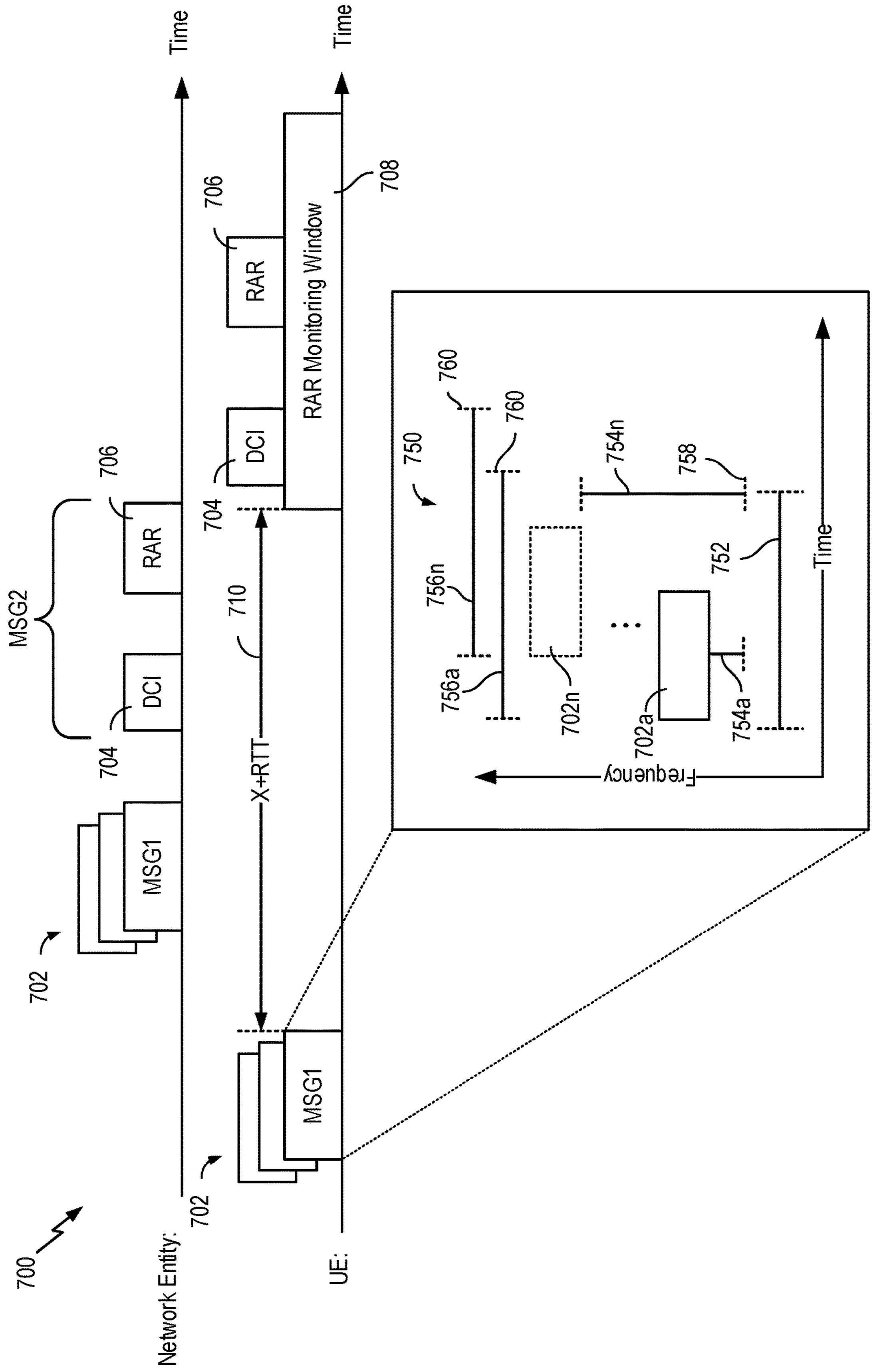
FIG. 7 illustrates example timing diagrams for random access communications associated with a network entity and a UE.

FIG. 7 illustrates example timing diagrams 700 for random access communications associated with a network entity (e.g., the BS 102 and/or the NTN payload 524) and a UE (e.g., the UE 104 and/or the UE 504). In this example, the UE transmits a plurality of random access preamble transmissions 702 (e.g., MSG1) with interleaving pre-compensation(s). The UE transmits the plurality of random access transmissions without waiting for the RAR. In certain aspects, each of the preamble transmissions 702 may include one or more preamble repetitions, which may be referred to as preamble repetition units (PRUs). The PRUs of a preamble transmission may apply frequency hopping in order to mitigate interference from other preamble transmissions.

The network entity receives the preamble transmissions 702. In some cases, due to the differing pre-compensation, the network entity is able to successfully decode at least one of the preamble transmission 702. In some cases, the network entity may combine some or all of the preamble transmissions 702 to improve the signal strength and/or signal quality of the received preamble transmissions 702. The combined preamble transmissions 702 may enhance the likelihood of the network entity being able to decode the preamble transmissions 702.

In response to the preamble transmissions 702, the network entity transmits MSG2 including DCI 704 and a RAR 706. The DCI 704 schedules the RAR 706 on a PDSCH, for example, as described herein with respect to FIG. 6A. In certain aspects, the network entity may respond to the preamble transmissions 702 in response to at least one of the preamble transmissions being successfully decoded. The network entity may respond to the earliest decoded preamble transmission among the received preamble transmissions 702. In some cases, the network entity may ignore the subsequent preamble transmissions after responding to the earliest decoded preamble transmission. The network entity may refrain from responding to any of the remaining received preamble transmissions 702 after successfully decoding at least one of the received preamble transmissions 702. In certain aspects, the network entity may respond to any of the preamble transmissions 702 received from the UE. The network entity may send multiple RARs in response to each of the received preamble transmissions 702 successfully decoded.

The UE monitors for the DCI 704 in a RAR monitoring window 708, which may start after a certain time duration 710 from the end of the preamble transmissions 702. In certain aspects, the UE may be allowed or expected to refrain from monitoring in the RAR monitoring window 708 as soon as the earliest RAR 706 is successfully decoded. As an example, the time duration 710, which defines the start of the RAR monitoring window 708, may be or include the sum of the RTT for wireless communications between the UE and the network entity (e.g., the RTT on the service link 534) and a number of subframes (or slots) X. The UE receives the DCI 704 and the RAR 706 in the RAR monitoring window 708.

An example of the interleaving pre-compensation for the preamble transmissions 702*a-n* is depicted in a time-frequency graph 750. A first preamble transmission 702*a* is transmitted in a RACH occasion 752 using a first pre-compensation (e.g., a first Doppler shift 754*a* and/or a first TA 756*a*), which may be estimated using the positioning signals received from a GNSS, as described herein with respect to FIG. 5. A second preamble transmission 702*n* is transmitted in the RACH occasion 752 using a second pre-compensation (e.g., a second Doppler shift 754*n* and/or a second TA 756*n*). In this example, the second preamble transmission 702*n* is arranged in a shifted time-frequency location relative to the first preamble transmission 702*a*. The preamble transmissions 702*a-n* may use any of various pre-compensations for frequency and/or timing. The frequency and/or timing shifts used for the interleaving pre-compensations may be performed in ascending order or descending order among the candidate frequency and/or timing shifts. In some cases, the frequency and/or timing shifts may be performed with a frequency hopping pattern and/or time hopping pattern. In certain aspects, the preamble transmissions may use the same time pre-compensation (e.g., the same TA) and a different frequency pre-compensation (e.g., a different Doppler shift), or vice versa. Note that the interleaving pre-compensation for preamble transmissions 702 described herein with respect to FIG. 7 may be applied to other random access transmissions, such as MSG3.

The timing pre-compensation may be applied to adjust the TA used to compensate for at least the propagation delay of the communication link (e.g., the service link 534) between the UE and the network entity (e.g., the NTN payload 524). For example, the timing pre-compensation may be used to synchronize the arrival time 760 of the random access transmission at the network entity due to at least the propagation delay of the signal propagating from the UE to the network entity. The timing pre-compensation may adjust the arrival time 760 of the signal transmitted from the UE to the network entity so that the arrival time 760 of the signal received at the network entity is aligned with a common reference time (e.g., a particular frame or subframe) at the network entity. The timing synchronization between the UE and the network entity allows the network entity to successfully decode the received signal. For example, UEs closer to the network entity have a shorter propagation delay, and thus, a smaller TA; whereas UEs farther from the network entity have a longer propagation delay, and thus, a larger TA.

The frequency pre-compensation may be applied to increase or decrease the frequency of a random access transmission depending on the Doppler effects on the communication link between the UE and the network entity (e.g., the Doppler effects on the service link 534). For example, due to Doppler effects, the frequency of the received signal increases when the distance between the transmitter and receiver decreases; conversely, the frequency of the received signal decreases when the distance between the transmitter and receiver increases. The frequency pre-compensation may be applied to counteract (or correct for) the Doppler effects on the communication link. For example, if the frequency of the received signal is decreased due to the Doppler effects, the frequency pre-compensation may increase the frequency of the transmitted signal relative to a specified carrier frequency 758. In this example, the frequency pre-compensation is depicted as being applied to the carrier frequencies for the preamble transmissions 702.

In certain aspects, the RAN may configure the interleaving pre-compensation for random access communications. The configuration may indicate or include the frequency shift(s) and/or the timing shifts to be applied for the pre-compensation. The configuration may indicate or include the total number of random access transmissions (e.g., MSG1 and/or MSG3) the UE may transmit with interleaving pre-compensation in a RACH occasion for MSG1 and/or in the time-frequency resource(s) allocated for MSG3. In certain aspects, the RAN may dynamically configure the interleaving pre-compensation for random access communications based on any of various factors, such as the network load or capacity, minimization of drive test (MDT) reports, etc. The MDT reports may record the random access transmissions (e.g., MSG1 and/or MSG3), and the RAN may refine the configuration for interleaving pre-compensation based on the MDT reports. For example, the RAN may adjust the pre-compensation shifts for frequency and/or timing based on the pre-compensation used as indicated by the MDT reports.

In certain aspects, the UE and/or the network entity (e.g., the NTN payload 524) may associate the successful pre-compensation (e.g., the frequency shift and/or timing shift) with a particular communications scenario (e.g., a UE mobility state, UE position, beam direction, satellite orbit, satellite position, etc.) exhibited during the interleaving pre-compensation transmissions. The UE and/or the network entity may then apply the pre-compensation when the communications scenario is encountered between the UE (or a different UE) and the network entity. In some cases, the association between the pre-compensation and a particular communications scenario may allow the UE and/or network entity to estimate or interpolate the pre-compensation for another communications scenario (e.g., a different UE mobility state).

As an example, the UE and/or the network entity may identify the random access transmission(s) that were successfully received and decoded at the network entity. Each of the transmissions transmitted with the interleaving pre-compensation may be assigned a different identifier (e.g., an interleaving transmission number). As an example, an initial preamble transmission 702*a* may be assigned the number 1, the next preamble transmission among the preamble transmissions 702 may be assigned the number 2, and so on until the last preamble transmission 702*n* is assigned the number N. The UE and/or the network entity may identify the transmission number(s) associated with the transmission(s) that were successfully received and decoded at the network entity. As the transmission number may indicate the pre-compensation frequency shift and/or timing shift applied to the transmission, the UE and/or the network entity may determine the time shift and/or the frequency shift used for such transmissions.

The UE and/or the network entity may map the pre-compensation (e.g., time shift and/or frequency shift) to a particular communications scenario exhibited while the UE was transmitting to the network entity and store such a mapping between the communications scenario and the pre-compensation. As an example, the communications scenario may correspond to or include the UE mobility state including low mobility, moderate mobility, and/or high mobility. When the UE is engaged in the same or similar communications scenario, the UE may use the pre-compensation associated with the communications scenario for communications between the UE and the network entity. In certain aspects, the UE may interpolate (or estimate) a pre-compensation for a present communications scenario (e.g., a low mobility state) based on the mapping between another pre-compensation and another communications scenario (e.g., a high mobility state). Such mappings may be crowdsourced among multiple UEs and shared with the network entity for the mappings to be used for refinement of the pre-compensation configuration, for example, depending on the present communications scenario exhibited by a UE. In some cases, the UE may obtain the crowdsourced mappings from the network entity and/or other UEs, and the UE may use the mappings to determine a pre-compensation for communications between the UE and the network entity.

Example Operations of Entities in a Communications Network

Figure 8:
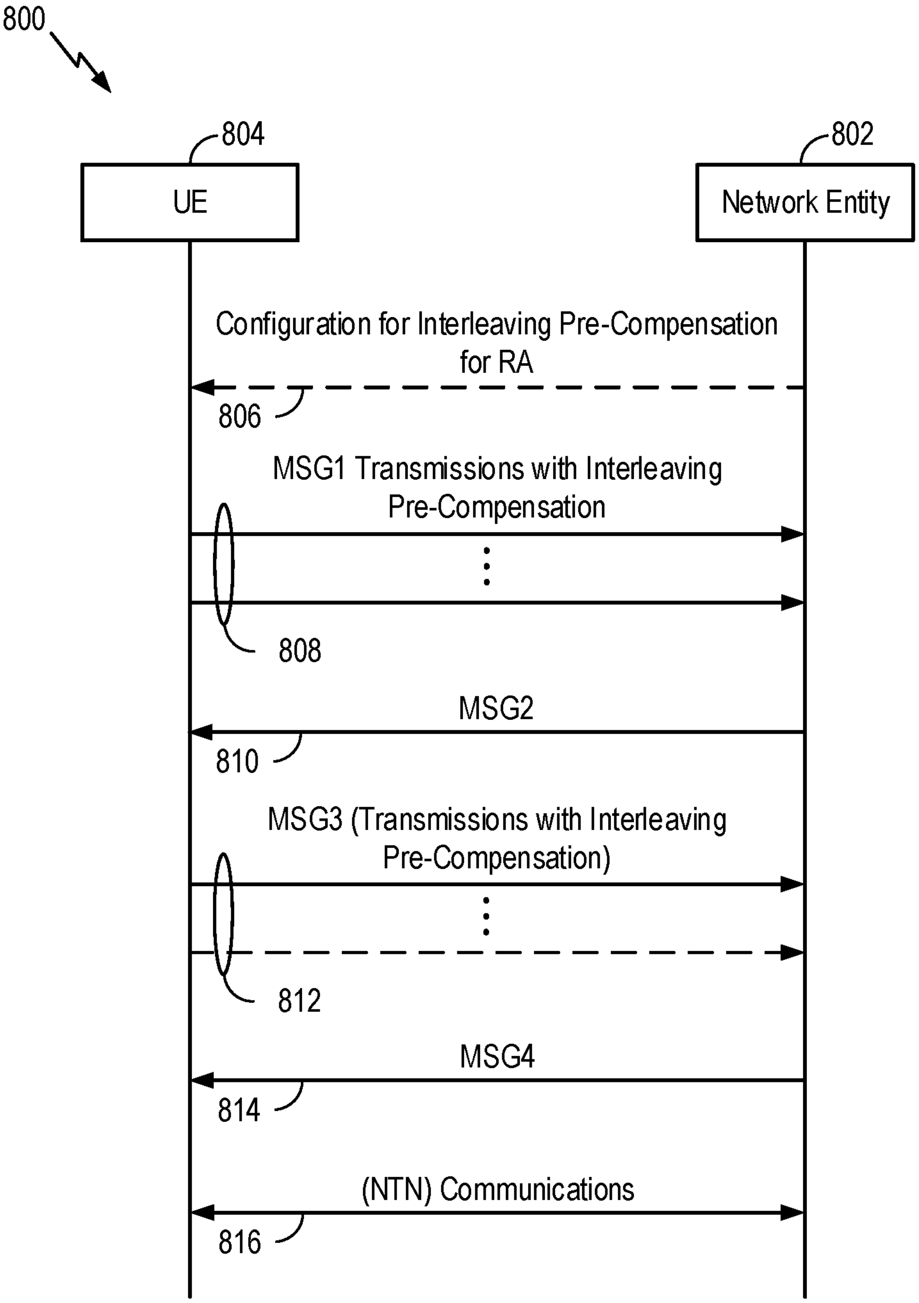
FIG. 8 depicts a process flow for communications in a network between a network entity and a UE.

FIG. 8 depicts a process flow 800 for communications in a network between a network entity 802 and a UE 804. In some aspects, the network entity 802 may be an example of the base station depicted and described with respect to FIGS. 1 and 3 or a disaggregated base station depicted and described with respect to FIG. 2. However, in other aspects, the UE 804 may be another type of wireless communications device, and network entity 802 may be another type of network entity or network node, such as those described herein. As an example, the UE 804 may be or include an NB-IoT device, and the network entity 802 may be or include an NTN payload.

At 806, the UE 804 may receive, from the network entity 802, a configuration associated with interleaving pre-compensation for random access communications. The configuration may indicate or include any of the various parameters or fields described herein, such as frequency shift(s) and/or timing shift(s) to be applied for pre-compensation. The UE 804 may receive the configuration via control signaling, such as system information, RRC signaling, MAC signaling, DCI, and/or sidelink control information (SCI). In some cases, the UE 804 may be pre-configured with a specific configuration for the interleaving pre-compensation, for example, as defined in a wireless communications standard, such as 3GPP. In certain cases, the UE 804 may determine a configuration for the interleaving pre-compensation. For example, the UE 804 may determine a candidate configuration for the interleaving pre-compensation based on synchronization signals received from the NTN payload and/or positioning signals received from a GNSS, such as the GNSS 526. In some cases, the UE 804 may estimate or select the frequency shift(s) and/or timing shift(s) to be applied for pre-compensation, and the UE 804 may send random access transmission to the network entity 802 using different offsets for the frequency shift(s) and/or timing shift(s) for the interleaving pre-compensation described herein.

At 808, the UE 804 transmits, to the network entity 802, random access preamble transmissions (MSG1) in a RACH (e.g., an NPRACH), for example, as described herein with respect to FIG. 7. For example, the UE 804 may transmit random access preamble transmissions using a different frequency pre-compensation for each of the random access preamble transmissions. Each of the random access preamble transmissions may use the same or different preamble sequence, number of preamble repetitions, and/or the frequency hopping pattern.

At 810, the UE 804 receives, from the network entity 802, a random access response (RAR) associated with the preamble transmission. The RAR may also be referred to as MSG2. For example, the UE 804 may receive, from the network entity 802, a PDCCH transmission (e.g., the DCI 704) scheduling the RAR (e.g., the RAR 706) on the PDSCH. The UE 804 may receive, from the BS, a PDSCH transmission carrying the RAR (e.g., a MAC PDU with the RAR payload associated with the preamble) in accordance with the scheduling indicated in the DCI. The RAR may provide an UL grant for MSG3 among other information, such as a TA value for MSG3.

At 812, in response to MSG2, the UE 804 transmits, to the network entity 802, one or more MSG3 transmissions via the PUSCH in accordance with the UL grant indicated in the RAR. In certain aspects, the UE 804 may transmit multiple MSG3 transmissions with interleaving pre-compensation as described herein with respect to FIG. 7. In some cases, each of the multiple MSG3 transmissions may be the same or a different message. In some cases, the UE 804 may refine the interleaving pre-compensation for the timing based on the TA value indicated in the RAR. The UE 804 may use the TA value indicated in the RAR for transmitting the MSG3 transmission(s). In some aspects, MSG3 may include an RRC connection request, a tracking area update, and/or a scheduling request (for an UL transmission).

At 814, the UE 804 receives, from the network entity 802, a contention resolution message (MSG4) in response to MSG3. In some cases, the MSG4 may include an RRC connection setup message in response to the RRC connection request and/or an UL grant in response to the scheduling request, for example.

At 816, the UE 804 communicates with the network entity 802 based on the RACH communications. For example, the UE 804 may transmit signals to an NTN payload, and the UE 804 may receive signals from the NTN payload. As an example, the UE 804 may apply any configuration for the communication link (e.g., the service link 534) between the UE 804 and the network entity 802 as indicated or included in the RRC connection setup message. The RRC connection setup message may indicate or include various configurations, such as configuration(s) for control signaling (e.g., a PDCCH or a control resource set), PUSCH, PUCCH, PDSCH, transmit power control(s), channel state feedback reporting (e.g., CSI reporting), SRS, antenna configuration, and/or scheduling requests. In certain aspects, the configuration provided in the RRC connection setup message may facilitate the reception of subsequent configurations. In some cases, the UE 804 may transmit an UL signal in accordance with the UL grant provided in MSG4. In certain aspects, the frequency and timing pre-compensation used for the random access procedure may be used for the communications at 812.

Note that the process flow 800 is an example of a CBRA procedure using interleaving pre-compensation for transmissions from the UE. Other signaling may be used in addition to or instead of those illustrated in the process flow 800, such as signaling associated with a CFRA procedure and/or a two-step RACH procedure, for example, as described herein with respect to FIG. 6B. As an example, for CFRA, the UE 804 may receive DCI that schedules the preamble transmissions at 808, as described herein. Such DCI may indicate or include setting(s) for the interleaving pre-compensation. As another example, for a two-step RACH procedure, the UE 804 may apply the interleaving pre-compensation to a plurality of MSGA transmissions in a RACH occasion.

Example Operations of a User Equipment

Figure 9:
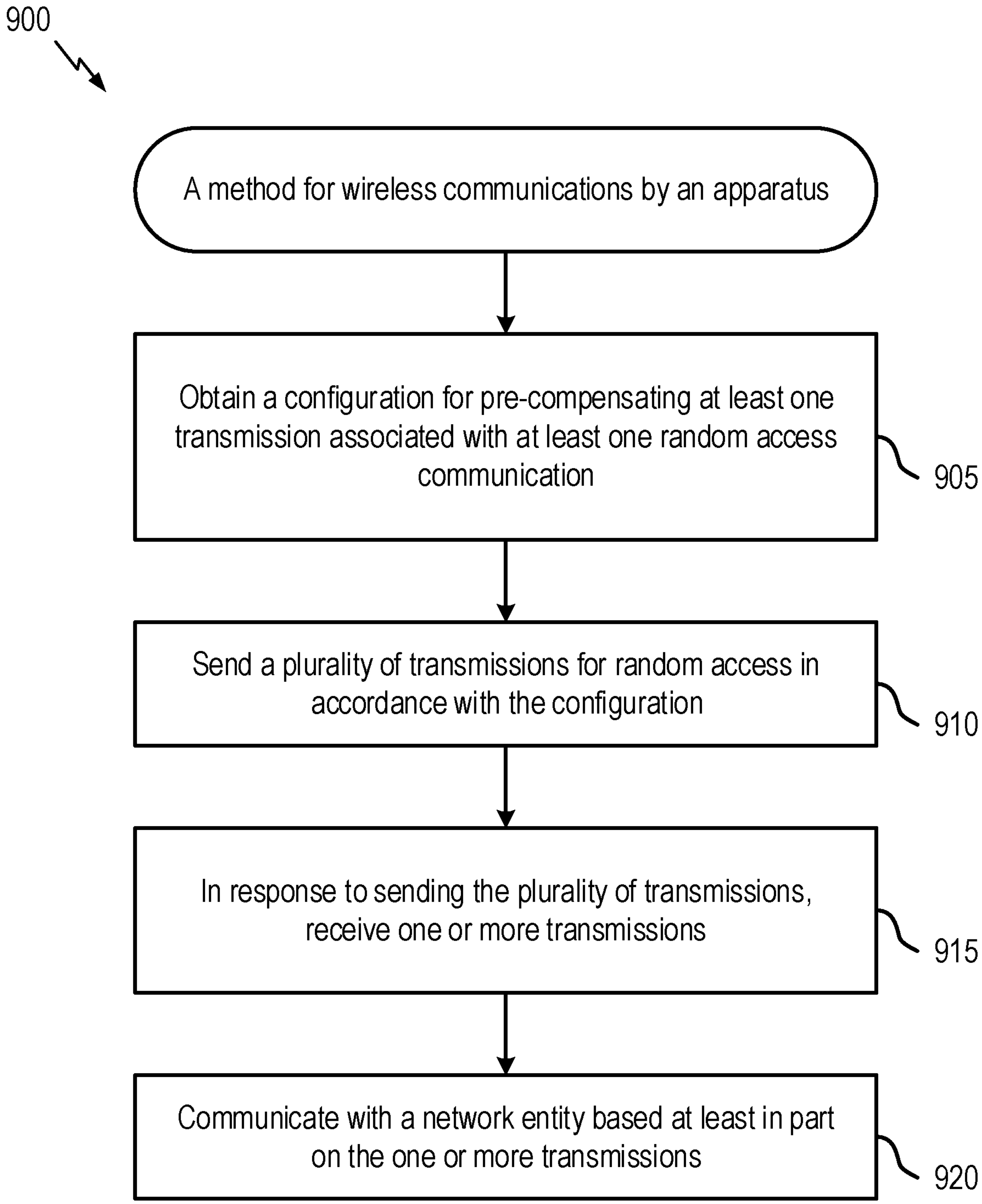
FIG. 9 depicts a method for wireless communications.

FIG. 9 shows a method 900 for wireless communications by an apparatus, such as UE 104 of FIGS. 1 and 3. In certain aspects, the apparatus may be or include an NB-IoT UE.

Method 900 begins at block 905 with obtaining a configuration for pre-compensating at least one transmission associated with at least one random access communication. For example, the UE may obtain a pre-configuration or a configuration from a network entity as described herein with respect to FIG. 8. In some cases, the UE may determine the configuration based on signals received from an NTN payload and/or a GNSS. For example, the UE may determine the configuration based on synchronization signals received from the NTN payload and/or positioning signals received from the GNSS. In certain cases, the UE may estimate, predict, or select the frequency shift(s) and/or timing shift(s) to be applied for pre-compensation. In certain aspects, the configuration comprises: an indication of one or more frequency shifts (e.g., Doppler shifts) or one or more timing shifts (e.g., TA shifts or adjustments) applied to at least one of the plurality of transmissions; an indication of a number of the plurality of transmissions to use for random access; or a combination thereof.

Method 900 then proceeds to block 910 with sending a plurality of transmissions for random access in accordance with the configuration. For example, the UE may transmit random access preamble transmissions with interleaving pre-compensation as described herein with respect to FIG. 7.

Method 900 then proceeds to block 915 with, in response to sending the plurality of transmissions, receiving one or more transmissions. For example, the UE may receive a RAR as described herein with respect to FIGS. 7 and 8.

Method 900 then proceeds to block 920 with communicating with a network entity based at least in part on the one or more transmissions, for example, as described herein with respect to FIG. 8.

In certain aspects, block 910 includes, for each transmission of the plurality of transmissions, sending that transmission with at least one of a different frequency shift to adjust a carrier frequency or a different timing shift to adjust a timing advance. In certain aspects, the respective frequency shift corresponds to applying a frequency pre-compensation for a Doppler shift associated with a communication link (e.g., the service link 534) between the network entity and the apparatus, and the respective timing shift corresponds to applying a timing pre-compensation for a propagation delay associated with the communication link.

In certain aspects, block 910 includes sending the plurality of transmissions with same one or more baseband frequencies and without adjusting the one or more baseband frequencies with a pre-compensation.

In certain aspects, each of the plurality of transmissions comprises a random access preamble transmission (e.g., MSG1) in a RACH (e.g., a NPRACH); and the one or more transmissions comprise a random access response (e.g., MSG2) in a PDSCH.

In certain aspects, each of the plurality of transmissions comprises an uplink transmission in a physical uplink shared channel (e.g., MSG3), the uplink transmission being scheduled via a random access response; and the one or more transmissions comprises a contention resolution transmission (e.g., MSG4).

In certain aspects, the one or more transmissions comprise a single random access response associated with the plurality of transmissions. For example, the network entity may send only a single RAR in response to the plurality of random access preamble transmissions as described herein with respect to FIG. 7.

In certain aspects, the one or more transmissions comprise a plurality of random access responses associated with the plurality of transmissions. For example, the network entity may send a RAR per random access preamble transmission received or successfully decoded at the network entity.

In certain aspects, block 915 includes: receiving at least one of the one or more transmissions in a response window (e.g., the RAR monitoring window 708); and refraining from monitoring for an additional transmission in the response window in response to successfully decoding the at least one of the one or more transmissions.

In certain aspects, method 900 further includes sending feedback (e.g., an MDT report) associated with the at least one random access communication performed in accordance with the configuration. In certain aspects, method 900 further includes obtaining an updated configuration for pre-compensating the at least one transmission associated with the at least one random access communication in response to the feedback. In certain aspects, the feedback comprises a minimization of drive test report.

In certain aspects, block 920 includes communicating with the network entity via non-terrestrial wireless communications, for example, as described herein with respect to FIG. 5. In certain aspects, the network entity comprises a non-terrestrial network entity (e.g., the NTN payload 524).

Figure 11:
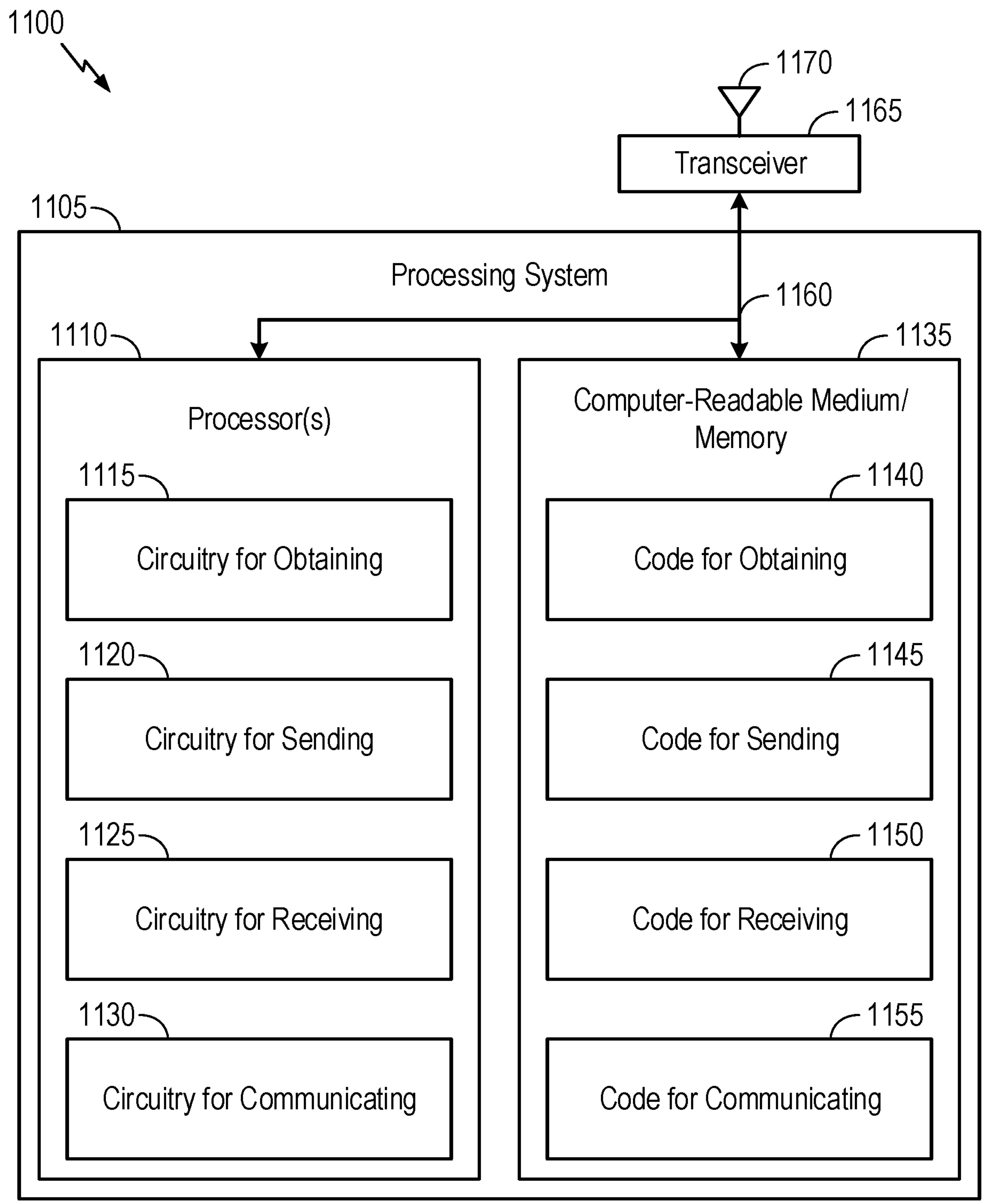
FIG. 11 depicts aspects of an example communications device.

In certain aspects, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative operations are possible consistent with this disclosure.

Example Operations of a Network Entity

Figure 10:
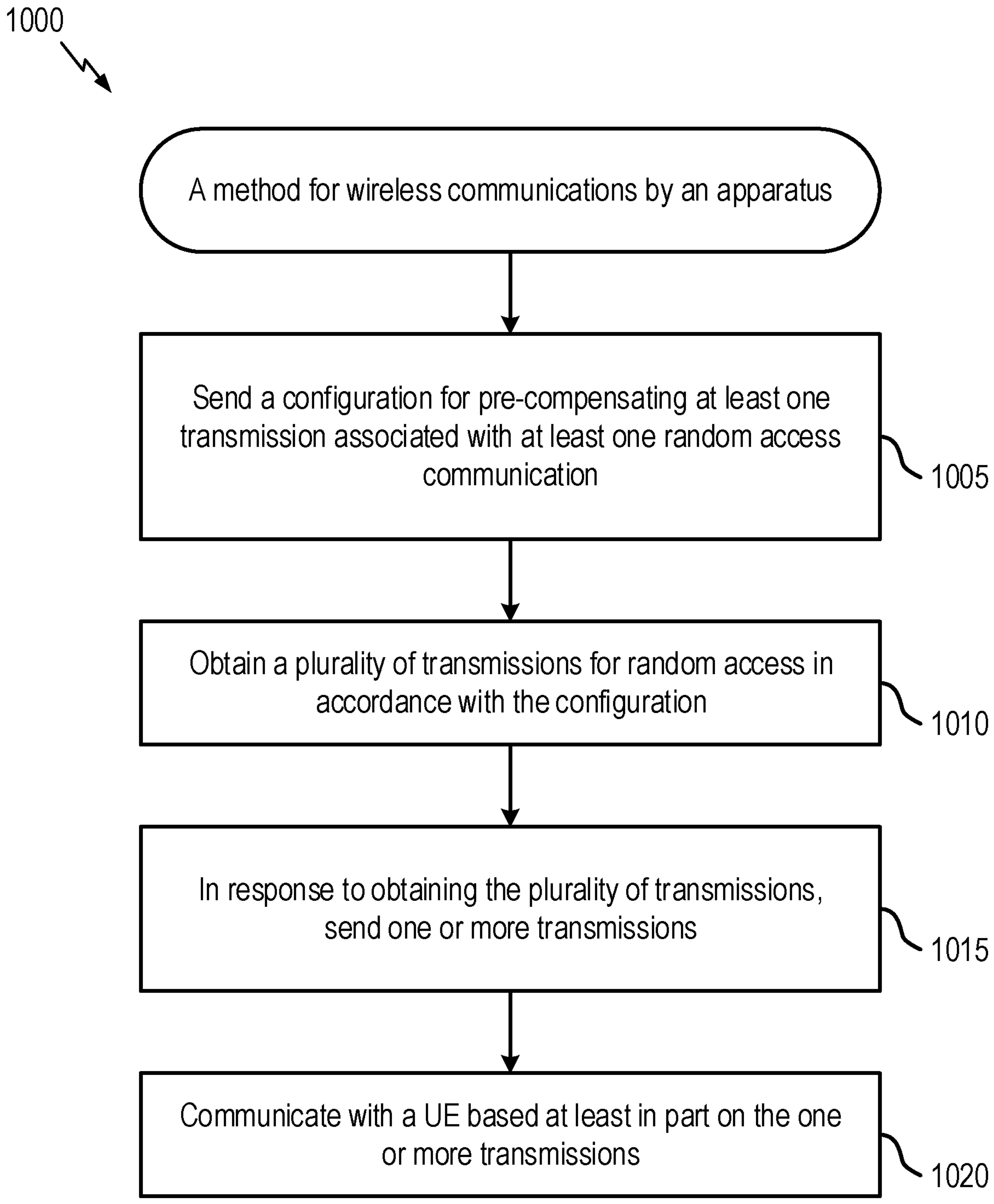
FIG. 10 depicts another method for wireless communications.

FIG. 10 shows a method 1000 for wireless communications by an apparatus, such as BS 102 of FIGS. 1 and 3, or a disaggregated base station as discussed with respect to FIG. 2.

Method 1000 begins at block 1005 with sending a configuration for pre-compensating at least one transmission associated with at least one random access communication. For example, the BS may send the configuration to the UE as described herein with respect to FIG. 8. In certain aspects, the configuration comprises: an indication of one or more frequency shifts (e.g., Doppler shifts) or one or more timing shifts (e.g., TA shifts or adjustments) applied to at least one of the plurality of transmissions; an indication of a number of the plurality of transmissions to use for random access; or a combination thereof.

Method 1000 then proceeds to block 1010 with obtaining a plurality of transmissions for random access in accordance with the configuration. For example, the network entity may obtain random access preamble transmissions with interleaving pre-compensation as described herein with respect to FIG. 7.

Method 1000 then proceeds to block 1015 with, in response to obtaining the plurality of transmissions, sending one or more transmissions. For example, the network entity may second a RAR as described herein with respect to FIGS. 7 and 8.

Method 1000 then proceeds to block 1020 with communicating with a UE based at least in part on the one or more transmissions, for example, as described herein with respect to FIG. 8.

In certain aspects, block 1010 includes, for each transmission of the plurality of transmissions, obtaining that transmission with at least one of a different frequency shift that adjusted a carrier frequency or a different timing shift that adjusted a timing advance. In certain aspects, the respective frequency shift corresponds to a frequency pre-compensation for a Doppler shift associated with a communication link (e.g., the service link 543) between the UE and the apparatus, and the respective timing shift corresponds to a timing pre-compensation for a propagation delay associated with the communication link.

In certain aspects, block 1010 includes obtaining the plurality of transmissions with same one or more baseband frequencies, the one or more baseband frequencies being unadjusted with a pre-compensation.

In certain aspects, each of the plurality of transmissions comprises a random access preamble transmission (e.g., MSG1) in a RACH (e.g., a NPRACH); and the one or more transmissions comprise a random access response (e.g., MSG2) in a PDSCH.

In certain aspects, each of the plurality of transmissions comprises an uplink transmission (e.g., MSG3) in a physical uplink shared channel, the uplink transmission being scheduled via a random access response; and the one or more transmissions comprises a contention resolution transmission (e.g., MSG4).

In certain aspects, the one or more transmissions comprise a single random access response associated with the plurality of transmissions. For example, the network entity may send only a single RAR in response to the plurality of random access preamble transmissions as described herein with respect to FIG. 7.

In certain aspects, the one or more transmissions comprise a plurality of random access responses associated with the plurality of transmissions. For example, the network entity may send a RAR per random access preamble transmission received or successfully decoded at the network entity.

In certain aspects, block 1010 includes: decoding a transmission of the plurality of transmissions; and refraining from decoding any remaining transmission of the plurality of transmissions in response to decoding the transmission.

In certain aspects, block 1010 includes: combining the plurality of transmissions into a combined transmission; and decoding the combined transmission.

In certain aspects, method 1000 further includes obtaining feedback associated with the at least one random access communication performed in accordance with the configuration. In certain aspects, method 1000 further includes sending an updated configuration for pre-compensating the at least one transmission associated with the at least one random access communication in response to the feedback. In certain aspects, the feedback comprises a minimization of drive test report.

In certain aspects, block 1020 includes communicating with the UE via non-terrestrial wireless communications, for example, as described herein with respect to FIG. 5. In certain aspects, the apparatus comprises a non-terrestrial network entity (e.g., the NTN payload 524).

Figure 12:
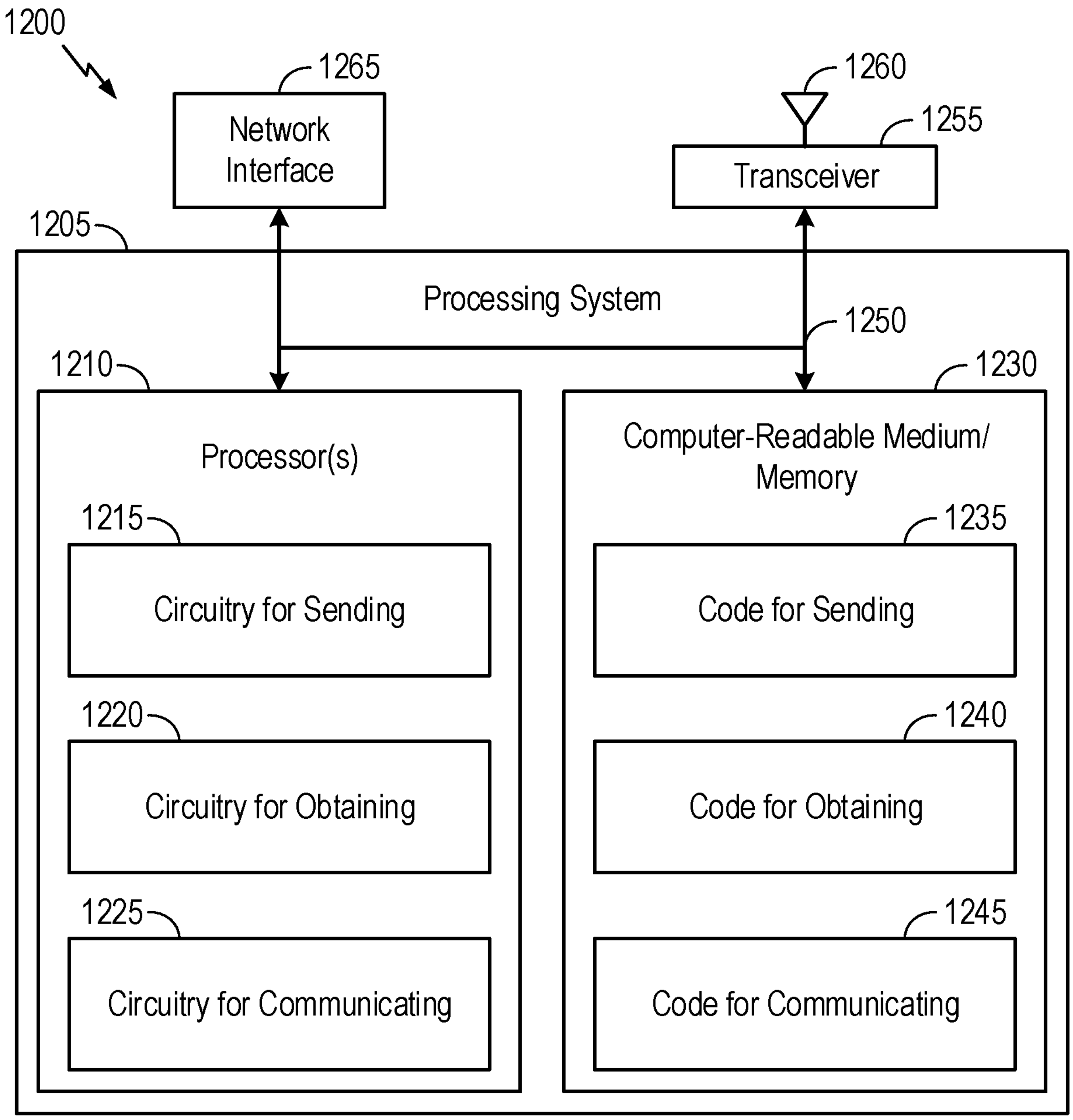
FIG. 12 depicts aspects of an example communications device.

In certain aspects, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative operations are possible consistent with this disclosure.

Example Communications Devices

FIG. 11 depicts aspects of an example communications device 1100. In some aspects, communications device 1100 is a user equipment, such as UE 104 described above with respect to FIGS. 1 and 3.

The communications device 1100 includes a processing system 1105 coupled to a transceiver 1165 (e.g., a transmitter and/or a receiver). The transceiver 1165 is configured to transmit and receive signals for the communications device 1100 via an antenna 1170, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1135 via a bus 1160. In certain aspects, the computer-readable medium/memory 1135 is configured to store processor-executable instructions (e.g., computer-executable code) that when executed by the one or more processors 1110, enable and cause the one or more processors 1110 to perform the method 900 described with respect to FIG. 9, or any aspect related to it, including any operations described in relation to FIG. 9. Note that reference to a processor performing a function of communications device 1100 may include one or more processors performing that function of communications device 1100, such as in a distributed fashion.

In the depicted example, computer-readable medium/memory 1135 stores code for obtaining 1140, code for sending 1145, code for receiving 1150, and code for communicating 1155. Processing of the code 1140-1155 may enable and cause the communications device 1100 to perform the method 900 described with respect to FIG. 9, or any aspect related to it.

The one or more processors 1110 include circuitry configured to implement (e.g., execute) the code stored in the computer-readable medium/memory 1135, including circuitry for obtaining 1115, circuitry for sending 1120, circuitry for receiving 1125, and circuitry for communicating 1130. Processing with circuitry 1115-1130 may enable and cause the communications device 1100 to perform the method 900 described with respect to FIG. 9, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1165 and/or antenna 1170 of the communications device 1100 in FIG. 11, and/or one or more processors 1110 of the communications device 1100 in FIG. 11. Means for communicating, receiving or obtaining may include the transceivers 354, antenna (s) 352, receive processor 358, and/or controller/processor 380 of the UE 104 illustrated in FIG. 3, transceiver 1165 and/or antenna 1170 of the communications device 1100 in FIG. 11, and/or one or more processors 1110 of the communications device 1100 in FIG. 11.

FIG. 12 depicts aspects of an example communications device 1200. In some aspects, communications device 1200 is a network entity, such as BS 102 of FIGS. 1 and 3, or a disaggregated base station as discussed with respect to FIG. 2.

The communications device 1200 includes a processing system 1205 coupled to a transceiver 1255 (e.g., a transmitter and/or a receiver) and/or a network interface 1265. The transceiver 1255 is configured to transmit and receive signals for the communications device 1200 via an antenna 1260, such as the various signals as described herein. The network interface 1265 is configured to obtain and send signals for the communications device 1200 via communications link(s), such as a backhaul link, midhaul link, and/or fronthaul link as described herein, such as with respect to FIG. 2. The processing system 1205 may be configured to perform processing functions for the communications device 1200, including processing signals received and/or to be transmitted by the communications device 1200.

The processing system 1205 includes one or more processors 1210. In various aspects, one or more processors 1210 may be representative of one or more of receive processor 338, transmit processor 320, TX MIMO processor 330, and/or controller/processor 340, as described with respect to FIG. 3. The one or more processors 1210 are coupled to a computer-readable medium/memory 1230 via a bus 1250. In certain aspects, the computer-readable medium/memory 1230 is configured to store processor-executable instructions (e.g., computer-executable code) that when executed by the one or more processors 1210, enable and cause the one or more processors 1210 to perform the method 1000 described with respect to FIG. 10, or any aspect related to it, including any operations described in relation to FIG. 10. Note that reference to a processor of communications device 1200 performing a function may include one or more processors of communications device 1200 performing that function, such as in a distributed fashion.

In the depicted example, the computer-readable medium/memory 1230 stores code for sending 1235, code for obtaining 1240, and code for communicating 1245. Processing of the code 1235-1245 may enable and cause the communications device 1200 to perform the method 1000 described with respect to FIG. 10, or any aspect related to it.

The one or more processors 1210 include circuitry configured to implement (e.g., execute) the code stored in the computer-readable medium/memory 1230, including circuitry for sending 1215, circuitry for obtaining 1220, and circuitry for communicating 1225. Processing with circuitry 1215-1225 may enable and cause the communications device 1200 to perform the method 1000 described with respect to FIG. 10, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1255 and/or antenna 1260 of the communications device 1200 in FIG. 12, and/or one or more processors 1210 of the communications device 1200 in FIG. 12. Means for communicating, receiving or obtaining may include the transceivers 332, antenna(s) 334, receive processor 338, and/or controller/processor 340 of the BS 102 illustrated in FIG. 3, transceiver 1255 and/or antenna 1260 of the communications device 1200 in FIG. 12, and/or one or more processors 1210 of the communications device 1200 in FIG. 12.

Example Clauses

Implementation examples are described in the following numbered clauses:

Clause 1: A method for wireless communications by an apparatus comprising: obtaining a configuration for pre-compensating at least one transmission associated with at least one random access communication; sending a plurality of transmissions for random access in accordance with the configuration; in response to sending the plurality of transmissions, receiving one or more transmissions; and communicating with a network entity based at least in part on the one or more transmissions.

Clause 2: The method of Clause 1, wherein the configuration comprises: an indication of one or more frequency shifts or one or more timing shifts applied to at least one of the plurality of transmissions; an indication of a number of the plurality of transmissions to use for random access; or a combination thereof.

Clause 3: The method of any one of Clauses 1-2, wherein sending the plurality of transmissions comprises: for each transmission of the plurality of transmissions, sending that transmission with at least one of a different frequency shift to adjust a carrier frequency or a different timing shift to adjust a timing advance.

Clause 4: The method of Clause 3, wherein sending the plurality of transmissions comprises: sending the plurality of transmissions with same one or more baseband frequencies and without adjusting the one or more baseband frequencies with a pre-compensation.

Clause 5: The method of Clause 3, wherein: the respective frequency shift corresponds to applying a frequency pre-compensation for a Doppler shift associated with a communication link between the network entity and the apparatus, and the respective timing shift corresponds to applying a timing pre-compensation for a propagation delay associated with the communication link.

Clause 6: The method of any one of Clauses 1-5, wherein: each of the plurality of transmissions comprises a random access preamble transmission in a RACH; and the one or more transmissions comprise a random access response in a PDSCH.

Clause 7: The method of any one of Clauses 1-5, wherein: each of the plurality of transmissions comprises an uplink transmission in a physical uplink shared channel, the uplink transmission being scheduled via a random access response; and the one or more transmissions comprises a contention resolution transmission.

Clause 8: The method of any one of Clauses 1-7, wherein the one or more transmissions comprise a single random access response associated with the plurality of transmissions.

Clause 9: The method of any one of Clauses 1-8, wherein the one or more transmissions comprise a plurality of random access responses associated with the plurality of transmissions.

Clause 10: The method of any one of Clauses 1-9, wherein receiving the one or more transmissions comprises: receiving at least one of the one or more transmissions in a response window; and refraining from monitoring for an additional transmission in the response window in response to successfully decoding the at least one of the one or more transmissions.

Clause 11: The method of any one of Clauses 1-10, further comprising: sending feedback associated with the at least one random access communication performed in accordance with the configuration; and obtaining an updated configuration for pre-compensating the at least one transmission associated with the at least one random access communication in response to the feedback.

Clause 12: The method of Clause 11, wherein the feedback comprises a minimization of drive test report.

Clause 13: The method of any one of Clauses 1-12, wherein communicating with the network entity comprises communicating with the network entity via non-terrestrial wireless communications.

Clause 14: The method of any one of Clauses 1-13, wherein the network entity comprises a non-terrestrial network entity.

Clause 15: A method for wireless communications by an apparatus comprising: sending a configuration for pre-compensating at least one transmission associated with at least one random access communication; obtaining a plurality of transmissions for random access in accordance with the configuration; in response to obtaining the plurality of transmissions, sending one or more transmissions; and communicating with a UE based at least in part on the one or more transmissions.

Clause 16: The method of Clause 15, wherein the configuration comprises: an indication of one or more frequency shifts or one or more timing shifts applied to at least one of the plurality of transmissions; an indication of a number of the plurality of transmissions to use for random access; or a combination thereof.

Clause 17: The method of any one of Clauses 15-16, wherein obtaining the plurality of transmissions comprises: for each transmission of the plurality of transmissions, obtaining that transmission with at least one of a different frequency shift that adjusted a carrier frequency or a different timing shift that adjusted a timing advance.

Clause 18: The method of Clause 17, wherein obtaining the plurality of transmissions comprises: obtaining the plurality of transmissions with same one or more baseband frequencies, the one or more baseband frequencies being unadjusted with a pre-compensation.

Clause 19: The method of Clause 17, wherein: the respective frequency shift corresponds to a frequency pre-compensation for a Doppler shift associated with a communication link between the UE and the apparatus, and the respective timing shift corresponds to a timing pre-compensation for a propagation delay associated with the communication link.

Clause 20: The method of any one of Clauses 15-19, wherein: each of the plurality of transmissions comprises a random access preamble transmission in a RACH; and the one or more transmissions comprise a random access response in a PDSCH.

Clause 21: The method of any one of Clauses 15-19, wherein: each of the plurality of transmissions comprises an uplink transmission in a physical uplink shared channel, the uplink transmission being scheduled via a random access response; and the one or more transmissions comprises a contention resolution transmission.

Clause 22: The method of any one of Clauses 15-21, wherein the one or more transmissions comprise a single random access response associated with the plurality of transmissions.

Clause 23: The method of any one of Clauses 15-22, wherein the one or more transmissions comprise a plurality of random access responses associated with the plurality of transmissions.

Clause 24: The method of any one of Clauses 15-23, wherein obtaining the plurality of transmissions comprises: decoding a transmission of the plurality of transmissions; and refraining from decoding any remaining transmission of the plurality of transmissions in response to decoding the transmission.

Clause 25: The method of any one of Clauses 15-24, wherein obtaining the plurality of transmissions comprises: combining the plurality of transmissions into a combined transmission; and decoding the combined transmission.

Clause 26: The method of any one of Clauses 15-25, further comprising: obtaining feedback associated with the at least one random access communication performed in accordance with the configuration; and sending an updated configuration for pre-compensating the at least one transmission associated with the at least one random access communication in response to the feedback.

Clause 27: The method of Clause 26, wherein the feedback comprises a minimization of drive test report.

Clause 28: The method of any one of Clauses 15-27, wherein communicating with the UE comprises communicating with the UE via non-terrestrial wireless communications.

Clause 29: The method of any one of Clauses 15-28, wherein the apparatus comprises a non-terrestrial network entity.

Clause 30: One or more apparatuses, comprising: one or more memories comprising executable instructions; and one or more processors configured to execute the executable instructions and cause the one or more apparatuses to perform a method in accordance with any one of clauses 1-29.

Clause 31: One or more apparatuses, comprising means for performing a method in accordance with any one of clauses 1-29.

Clause 32: One or more non-transitory computer-readable media comprising executable instructions that, when executed by one or more processors of one or more apparatuses, cause the one or more apparatuses to perform a method in accordance with any one of clauses 1-29.

Clause 33: One or more computer program products embodied on one or more computer-readable storage media comprising code for performing a method in accordance with any one of clauses 1-29.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:

one or more memories; and one or more processors coupled to the one or more memories, the one or more processors being configured to cause the apparatus to:

obtain a configuration for pre-compensating at least one transmission associated with at least one random access communication, send a plurality of first transmissions for random access in accordance with the configuration, wherein the configuration comprises an indication of a total number of the plurality of first transmissions associated with the at least one random access communication wherein to send the plurality of first transmissions, the one or more processors are configured to cause the apparatus to, for each transmission of the plurality of first transmissions, send, before communication of a response to the plurality of first transmissions, that transmission with a different timing shift to adjust a timing advance, after sending the plurality of first transmissions, receive one or more second transmissions, and communicate with a network entity based at least in part on the one or more second transmissions.

2. The apparatus of claim 1, wherein the configuration comprises:

an indication of a plurality of frequency shifts associated with the at least one random access communication; or an indication of a plurality of timing shifts associated with the at least one random access communication.

3. The apparatus of claim 1, wherein to send the plurality of first transmissions the one or more processors are configured to cause the apparatus to:

for each transmission of the plurality of first transmissions, send that transmission with a different frequency shift to adjust a carrier frequency.

4. The apparatus of claim 3, wherein to send the plurality of first transmissions, the one or more processors are configured to cause the apparatus to:

send the plurality of first transmissions with same one or more baseband frequencies and without adjusting the one or more baseband frequencies with a pre-compensation.

5. The apparatus of claim 3, wherein:

the respective frequency shift corresponds to applying a frequency pre-compensation for a Doppler shift associated with a communication link between the network entity and the apparatus, and the respective timing shift corresponds to applying a timing pre-compensation for a propagation delay associated with the communication link.

6. The apparatus of claim 1, wherein:

each of the plurality of first transmissions comprises a random access preamble transmission in a random access channel (RACH); and the one or more second transmissions comprise a random access response in a physical downlink shared channel (PDSCH).

7. The apparatus of claim 1, wherein:

each of the plurality of first transmissions comprises an uplink transmission in a physical uplink shared channel, the uplink transmission being scheduled via a random access response; and the one or more second transmissions comprise a contention resolution transmission.

8. The apparatus of claim 1, wherein the one or more second transmissions comprise a single random access response associated with the plurality of first transmissions.

9. The apparatus of claim 1, wherein the one or more second transmissions comprise a plurality of random access responses associated with the plurality of first transmissions.

10. The apparatus of claim 1, wherein to receive the one or more second transmissions, the one or more processors are configured to cause the apparatus to:

receive at least one of the one or more second transmissions in a response window; and refrain from monitoring for an additional transmission in the response window in response to successfully decoding the at least one of the one or more second transmissions.

11. The apparatus of claim 1, wherein the one or more processors are configured to cause the apparatus to:

send feedback associated with the at least one random access communication performed in accordance with the configuration; and obtain an updated configuration for pre-compensating the at least one transmission associated with the at least one random access communication in response to the feedback.

12. The apparatus of claim 11, wherein the feedback comprises a minimization of drive test report.

13. An apparatus configured for wireless communications, comprising:

one or more memories; and one or more processors coupled to the one or more memories, the one or more processors being configured to cause the apparatus to:

send a configuration for pre-compensating at least one transmission associated with at least one random access communication, obtain a plurality of first transmissions for random access in accordance with the configuration, wherein the configuration comprises an indication of a total number of the plurality of first transmissions associated with the at least one random access communication, wherein to obtain the plurality of first transmissions, the one or more processors are configured to cause the apparatus to, for each transmission of the plurality of first transmissions, obtain, before communication of a response to the plurality of first transmissions, that transmission with a different timing shift that adjusted a timing advance, in response to obtaining the plurality of first transmissions, send one or more second transmissions, and communicate with a user equipment (UE) based at least in part on the one or more second transmissions.

14. The apparatus of claim 13, wherein the configuration comprises:

an indication of a plurality of frequency shifts associated with the at least one random access communication; or an indication of a plurality of timing shifts associated with the at least one random access communication.

15. The apparatus of claim 13, wherein to obtain the plurality of first transmissions the one or more processors are configured to cause the apparatus to:

for each transmission of the plurality of first transmissions, obtain that transmission with a different frequency shift that adjusted a carrier frequency.

16. The apparatus of claim 15, wherein to obtain the plurality of first transmissions, the one or more processors are configured to cause the apparatus to:

obtain the plurality of first transmissions with same one or more baseband frequencies, the one or more baseband frequencies being unadjusted with a pre-compensation.

17. The apparatus of claim 15, wherein:

the respective frequency shift corresponds to a frequency pre-compensation for a Doppler shift associated with a communication link between the UE and the apparatus, and the respective timing shift corresponds to a timing pre-compensation for a propagation delay associated with the communication link.

18. The apparatus of claim 13, wherein:

each of the plurality of first transmissions comprises a random access preamble transmission in a random access channel (RACH); and the one or more second transmissions comprise a random access response in a physical downlink shared channel (PDSCH).

19. The apparatus of claim 13, wherein:

each of the plurality of first transmissions comprises an uplink transmission in a physical uplink shared channel, the uplink transmission being scheduled via a random access response; and the one or more second transmissions comprise a contention resolution transmission.

20. The apparatus of claim 13, wherein the one or more second transmissions comprise a single random access response associated with the plurality of first transmissions.

21. The apparatus of claim 13, wherein the one or more second transmissions comprise a plurality of random access responses associated with the plurality of first transmissions.

22. The apparatus of claim 13, wherein to obtain the plurality of first transmissions, the one or more processors are configured to cause the apparatus to:

decode a transmission of the plurality of first transmissions; and refrain from decoding any remaining transmission of the plurality of first transmissions in response to decoding the transmission.

23. The apparatus of claim 13, wherein to obtain the plurality of first transmissions, the one or more processors are configured to cause the apparatus to:

combine the plurality of first transmissions into a combined transmission; and decode the combined transmission.

24. The apparatus of claim 13, wherein the one or more processors are configured to cause the apparatus to:

obtain feedback associated with the at least one random access communication performed in accordance with the configuration; and send an updated configuration for pre-compensating the at least one transmission associated with the at least one random access communication in response to the feedback.

25. The apparatus of claim 24, wherein the feedback comprises a minimization of drive test report.

26. A method of wireless communications by an apparatus, comprising:

obtaining a configuration for pre-compensating at least one transmission associated with at least one random access communication;

sending a plurality of first transmissions for random access in accordance with the configuration, wherein the configuration comprises an indication of a total number of the plurality of first transmissions associated with the at least one random access communication, wherein sending the plurality of first transmissions comprises, for each transmission of the plurality of first transmissions, sending, before communication of a response to the plurality of first transmissions, that transmission with a different timing shift to adjust a timing advance;

after sending the plurality of first transmissions, receiving one or more second transmissions; and communicating with a network entity based at least in part on the one or more second transmissions.

27. A method of wireless communications by an apparatus, comprising:

sending a configuration for pre-compensating at least one transmission associated with at least one random access communication;

obtaining a plurality of first transmissions for random access in accordance with the configuration, wherein the configuration comprises an indication of a total number of the plurality of first transmissions associated with the at least one random access communication, wherein obtaining the plurality of first transmissions comprises, for each transmission of the plurality of first transmissions, obtaining, before communication of a response to the plurality of first transmissions, that transmission with a different timing shift that adjusted a timing advance;

in response to obtaining the plurality of first transmissions, sending one or more second transmissions; and communicating with a user equipment (UE) based at least in part on the one or more second transmissions.

* * * * *